United States Patent
Mundt et al.

(10) Patent No.: US 6,920,015 B2
(45) Date of Patent: Jul. 19, 2005

(54) DISC HEAD SLIDER DESIGNS TO REDUCE PARTICLE SENSITIVITY

(75) Inventors: Michael E. Mundt, Longmont, CO (US); Mark A. Chapin, Louisville, CO (US); Zine-Eddine Boutaghou, Vadnais Heights, MN (US); Ram M. Rao, Roseville, MN (US); John R. Pendray, Edina, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/114,843

(22) Filed: Apr. 3, 2002

(65) Prior Publication Data

US 2002/0145828 A1 Oct. 10, 2002

Related U.S. Application Data

(60) Provisional application No. 60/305,755, filed on Jul. 16, 2001, provisional application No. 60/281,496, filed on Apr. 4, 2001, and provisional application No. 60/281,238, filed on Apr. 3, 2001.

(51) Int. Cl.[7] .......................... G11B 5/60; G11B 17/32; G11B 21/21
(52) U.S. Cl. .............................. 360/235.6; 360/235.8; 360/236; 360/236.3
(58) Field of Search .............................. 360/235.6, 236, 360/236.4, 235.8, 236.3, 236.6, 237

(56) References Cited

U.S. PATENT DOCUMENTS

| | | | |
|---|---|---|---|
| 4,212,044 A | 7/1980 | Plotto | 360/103 |
| 4,225,891 A | 9/1980 | Plotto | 360/103 |
| 4,486,798 A | 12/1984 | Feliss et al. | 360/103 |
| 4,510,541 A | 4/1985 | Sasamoto | 360/97 |
| 4,636,894 A | 1/1987 | Mo | 360/103 |
| 4,700,248 A | 10/1987 | Coughlin et al. | 360/103 |
| 5,210,666 A | 5/1993 | Chapin et al. | 360/103 |
| 5,317,465 A | 5/1994 | Chapin et al. | 360/103 |
| 5,406,432 A | 4/1995 | Murray | 360/103 |
| 5,430,591 A * | 7/1995 | Takeuchi et al. | 360/236.1 |
| 5,467,238 A | 11/1995 | Lee et al. | 360/128 |

(Continued)

FOREIGN PATENT DOCUMENTS

| | | | | |
|---|---|---|---|---|
| JP | 54-8514 | | 1/1979 | |
| JP | 54080728 A | * | 6/1979 | G11B/5/60 |
| JP | 56-134354 | | 10/1981 | |
| JP | 60-13369 | | 1/1985 | |
| JP | 61-148685 | | 7/1986 | |
| JP | 63037874 A | * | 2/1988 | G11B/21/21 |
| JP | 1-298585 | | 12/1989 | |
| JP | 01319188 A | * | 12/1989 | G11B/21/21 |
| JP | 11149732 A | * | 6/1999 | G11B/21/21 |
| WO | WO 99/00792 | | 1/1999 | |

OTHER PUBLICATIONS

U.S. Appl. No. 10/113,997, filed Apr. 1, 2002, Rao.
U.S. Appl. No. 10/115,457, filed Apr. 3, 2002, Boutaghou et al.
Design, Simulation, Fabrication and Measurement of a 25NM, 50% Slider By: S.Lu et al., 1995 IEEE Transactions on Magnetics, Nov. 1995, vol. 31, No. 6, pp 2952–2954.

*Primary Examiner*—Craig A. Renner
(74) *Attorney, Agent, or Firm*—Westman, Champlin & Kelly, P.A.; Todd R. Fronek

(57) ABSTRACT

A head slider is provided that includes a slider body having leading and trailing slider edges and first and second side edges. The body further includes an air bearing surface generally disposed within a bearing surface plane. A raised portion is positioned on the bearing surface plane and spaced apart from the leading edge. Also, a comb structure is provided having a plurality of raised protrusions positioned proximate and substantially parallel to the leading edge of the slider, wherein the plurality of raised protrusions form gaps throughout the leading edge.

23 Claims, 19 Drawing Sheets

U.S. PATENT DOCUMENTS

| | | | |
|---|---|---|---|
| 5,490,025 A | 2/1996 | Dorius et al. | 360/103 |
| 5,550,693 A * | 8/1996 | Hendriks et al. | 360/236.6 |
| 5,568,981 A * | 10/1996 | Nepela et al. | 360/236 |
| 5,751,517 A | 5/1998 | Agarwal | 360/103 |
| 5,774,304 A | 6/1998 | Crane et al. | 360/103 |
| 5,831,792 A | 11/1998 | Ananth | 360/103 |
| 5,940,249 A | 8/1999 | Hendriks | 360/103 |
| 6,057,983 A * | 5/2000 | Kajitani | 360/235.6 |
| 6,188,547 B1 | 2/2001 | Gui et al. | 360/236.5 |
| 6,510,027 B1 * | 1/2003 | Chapin et al. | 360/236.3 |
| 2002/0012199 A1 | 1/2002 | Polycarpou et al. | 360/236.6 |
| 2002/0075598 A1 * | 6/2002 | Boutaghou et al. | 360/235.6 |

* cited by examiner

DISC HEAD SLIDER DESIGNS TO REDUCE PARTICLE SENSITIVITY

CROSS-REFERENCE TO RELATED APPLICATION

This application claims priority from U.S. Provisional Application Ser. No. 60/281,238 filed on Apr. 3, 2001 for inventor Zine-Eddine Boutaghou and entitled "TOOTH COMB DESIGN FOR AAB FOR DEBRIS ENTRAPMENT," from U.S. Provisional Application Ser. No. 60/305,755 filed on Jul. 16, 2001 for inventors Zine-Eddine Boutaghou, Ram Rao and John Pendray and entitled, "PARTICLE INSENSITIVE AIR BEARING DESIGNS," and from U.S. Provisional Application Ser. No. 60/281,496, filed on Apr. 4, 2001 for inventors Mark Chapin and Michael Mundt and entitled, "COMB-STYLE AAB FOR IMPROVED TRIBOLOGY."

FIELD OF THE INVENTION

The present invention relates generally to disc drive systems, and particularly but not by limitation to disc head sliders within disc drive systems.

BACKGROUND OF THE INVENTION

In data processing systems, disc drives are often used as storage devices. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each slider assembly. The suspension includes a load beam and a gimbal. The load beam provides a load force that forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One type of slider is a "self-loading" air bearing slider, which includes a leading taper (or stepped-taper), a pair of raised side rails, a cavity dam and a sub-ambient pressure cavity. The leading taper is typically lapped or etched onto the end of the slider that is opposite to the recording head. The leading taper pressurizes the air as the air is dragged under the slider by the disc surface. The leading taper has been observed to allow large particles to enter between the slider and the disc surface. An additional effect of the leading taper is that the pressure distribution under the slider has a first peak near the taper end or "leading edge" due to a high compression angle of the taper or step, and a second peak near the recording end or "trailing edge" due to a low bearing clearance for efficient magnetic recording. This dual-peak pressure distribution results in a bearing with a relatively high pitch stiffness.

The bearing clearance between the slider and the disc surface at the recording height is an important parameter to disc drive performance. Efforts have been made to design sliders having specialized features on the disc-facing surface that enable the slider to operate at particularly low fly heights. As slider designs evolve and average flying heights continue to be reduced, contamination particles have been observed to become an increasing source of head modulation leading, in some cases, to read/write failures. Many low fly height slider designs have been observed to encourage an accumulation of contamination particles near the trailing edge bearing surface of the slider and/or the transducer region of the slider. Particles that reach these regions of the slider can occasionally lead to irrecoverable data loss.

Many slider designs include a center pad bearing surface (i.e., an air bearing surface) that is situated proximate a trailing edge of the slider's disc-facing surface. The center pad bearing surface is typically situated proximate the transducer and centered laterally along the trailing edge. In many instances, the slider's other disc-facing surface features are configured such that the flow (i.e., air flow) directed at the center pad bearing surface during operation is not emphasized. Configurations such as these are disadvantageous in that it has been observed that an increased pressurization of the center pad bearing surface improves the disc following capability of the transducer.

Embodiments of the present invention provide solutions to one or more of these and/or other problems, and offer advantages over the prior art.

SUMMARY OF THE INVENTION

The present invention relates to data storage devices that include disc head sliders having disc-facing surface configurations that address the above-mentioned problems. The disc head slider includes a slider body having leading and trailing slider edges and first and second side edges. The body further includes an air bearing surface generally disposed within a bearing surface plane. A raised portion is positioned on the bearing surface plane and spaced apart from the leading edge. Also, a comb structure is provided having a plurality of raised protrusions positioned proximate and substantially parallel to the leading edge of the slider, wherein the plurality of raised protrusions form gaps throughout the leading edge.

In another embodiment, a disc head slider includes a slider body with leading and trailing slider edges and first and second side edges. The body has a disc facing surface including an air bearing surface generally disposed within a bearing surface plane. At least one rail extends toward the trailing edge and includes a recessed surface and a bearing surface. In addition, a comb structure is positioned on the recessed surface closer to the leading edge than the bearing surface and including a plurality of raised protrusions substantially parallel to the leading edge. The plurality of raised protrusions further form gaps throughout the recessed surface.

Other features and benefits that characterize embodiments of the present invention will be apparent upon a reading of the following detailed description and review of the associated drawings.

DETAILED DESCRIPTION OF ILLUSTRATIVE EMBODIMENTS

Figure 1:
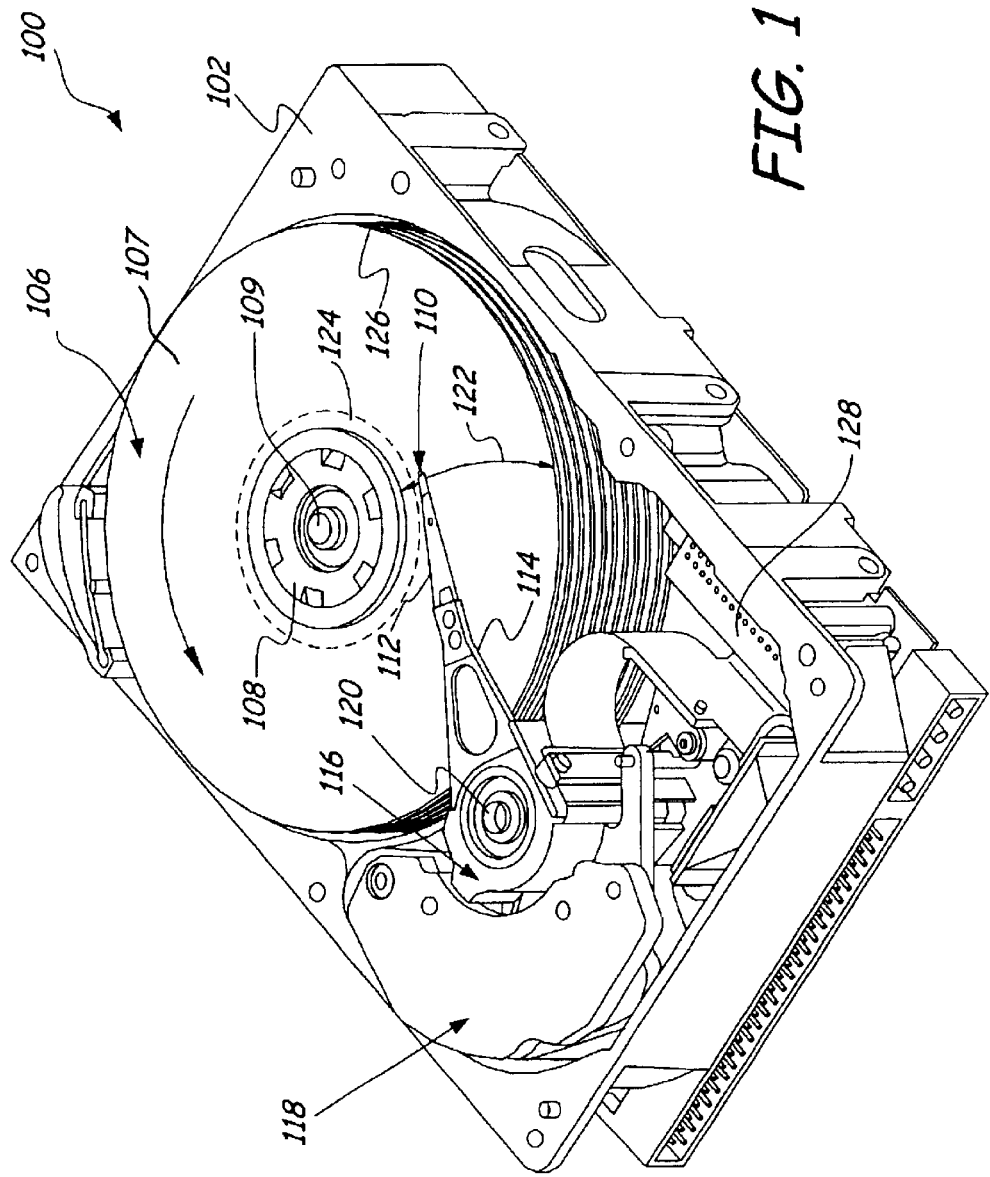
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface. The read/write head can include any type of transducing head, such as an inductive head, a magneto-resistive head, an optical head or a magneto-optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 is driven by servo electronics 128 based on signals generated by sliders 110 and a host computer (not shown). Other types of actuators can also be used, such as linear actuators.

During operation, as discs 107 rotate, the discs drag air under the respective sliders 110 and along their air bearing surfaces in a direction approximately parallel to the tangential velocity of the discs. As the air passes beneath the air bearing surfaces, air compression along the air flow path causes the air pressure between the discs and the air bearing surfaces to increase, which creates a hydrodynamic lifting force that counteracts the load force provided by suspensions 112 and causes the sliders 110 to lift and fly above or in close proximity to the disc surfaces.

In accordance with an embodiment of the present invention, sliders 110 include specialized features formed in their surfaces that face discs 107. Illustratively, some of these specialized features enable reductions in the undesirable accumulation of contamination particles in the transducer regions of sliders 110. In addition, some of the specialized features enhance the flight performance of sliders 110 by improving the disc following capability of transducers associated with sliders 110.

As will be described below, at least one and potentially several of the disc-facing surface features include a raised portion spaced apart from the leading edge and also include a bearing surface. The raised portion can be of any shape and include rails, cavity dams, pads, bulges, bumps, and other elements positioned on a disc facing surface. When a slider is positioned relative a disc (i.e., disc 107 in FIG. 1), the bearing surface(s) will generally be positioned closer to the disc than other surfaces. Illustratively, the bearing surface(s) are generally in a plane that, for the purpose of the present description, will be referred to as the bearing surface plane. In accordance with one embodiment, a slider includes multiple bearing surfaces that are generally coplanar within the bearing surface plane and are therefore positioned approximately the same distance from the disc (i.e., disc 107).

Generally speaking, when a disc head slider operates within a disc drive, the slider is typically configured to pitch and roll in response to various topographical features associated with a disc surface. Also, many sliders are configured to demonstrate an operational pitch wherein the trailing end is in closer proximity to the disc surface than the leading end. It should be pointed out, that in the context of the present description, when references are made to the position of slider surfaces relative a disc (e.g., one surface extends further towards the disc surface than another), it should be assumed that the slider is positioned in a plane that is generally parallel with the disc surface (the slider generally positioned flatly without any pitch or roll displacement).

It should be pointed out that it is common for disc head sliders, such as slider 110, to include a slight curvature in their length and/or width directions. Such curvatures are commonly referred to as slider crown curvature and slider cross curvature. Accordingly, it is to be understood that the surfaces and surface planes described herein, including the bearing surface plane, may reflect slider crown and cross curvature, rather than being disposed in a perfectly flat plane.

For the purpose of the present description, references will be made to surfaces having a relative depth. For example, one surface might have a depth that is greater or less than the depth of another surface. It should be assumed that the described depths are measured from the bearing surface plane. Therefore, "depths," as that term is used in the present description are generally measured from a plane that is generally coplanar with at least one described bearing surface. A surface having a deep or large depth will be further displaced from the bearing surface plane than a surface having a shallow or small depth. A bearing surface will illustratively be assigned a depth value of zero. In addition, some surfaces may lie in a plane displaced from the bearing surface plane and in a direction away from the disc facing surface. These surfaces are said to be raised above or extend above the bearing surface plane.

Figure 2:
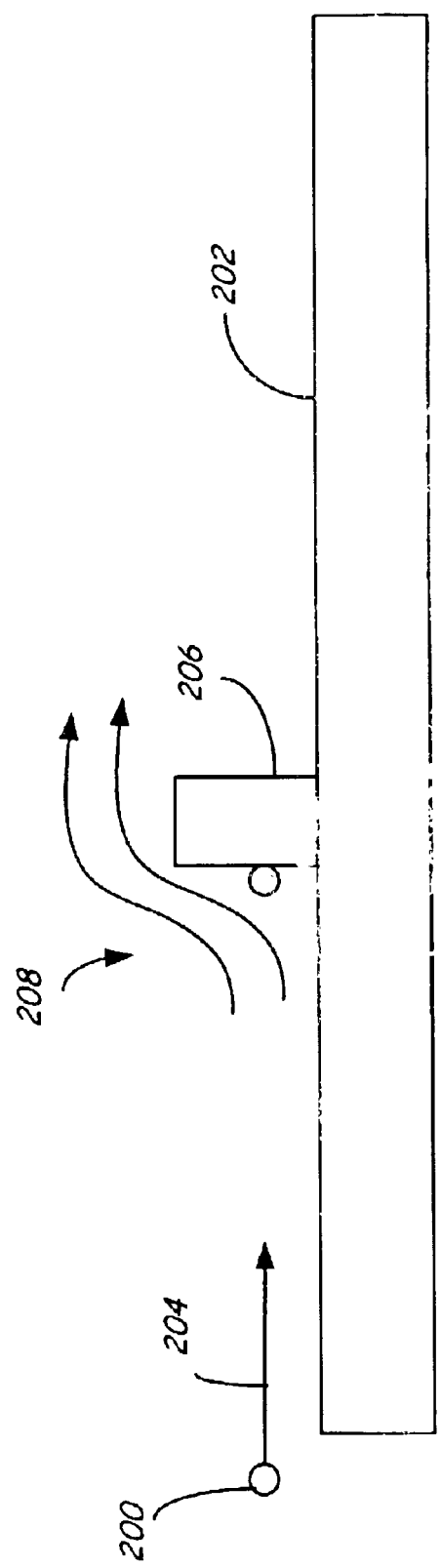
FIG. 2 illustrates a schematic view of trapping a particle.

It has been observed that debris and other particles, due to their inertia, are less apt than air molecules to flow around sharp transitions. Thus, including a sharp transition may "trap" particles and still allow air to flow around the transition. FIG. 2 illustrates a particle 200 flowing above a surface 202. Airflow 204 carries particle 200 towards a protrusion 206 on surface 202. As illustrated, particle 200 is trapped at protrusion 206 while airflow travels over protrusion 206, shown generally by arrows 208. The airflow 208 can pressurize surface 202 behind protrusion 206.

Figure 3:
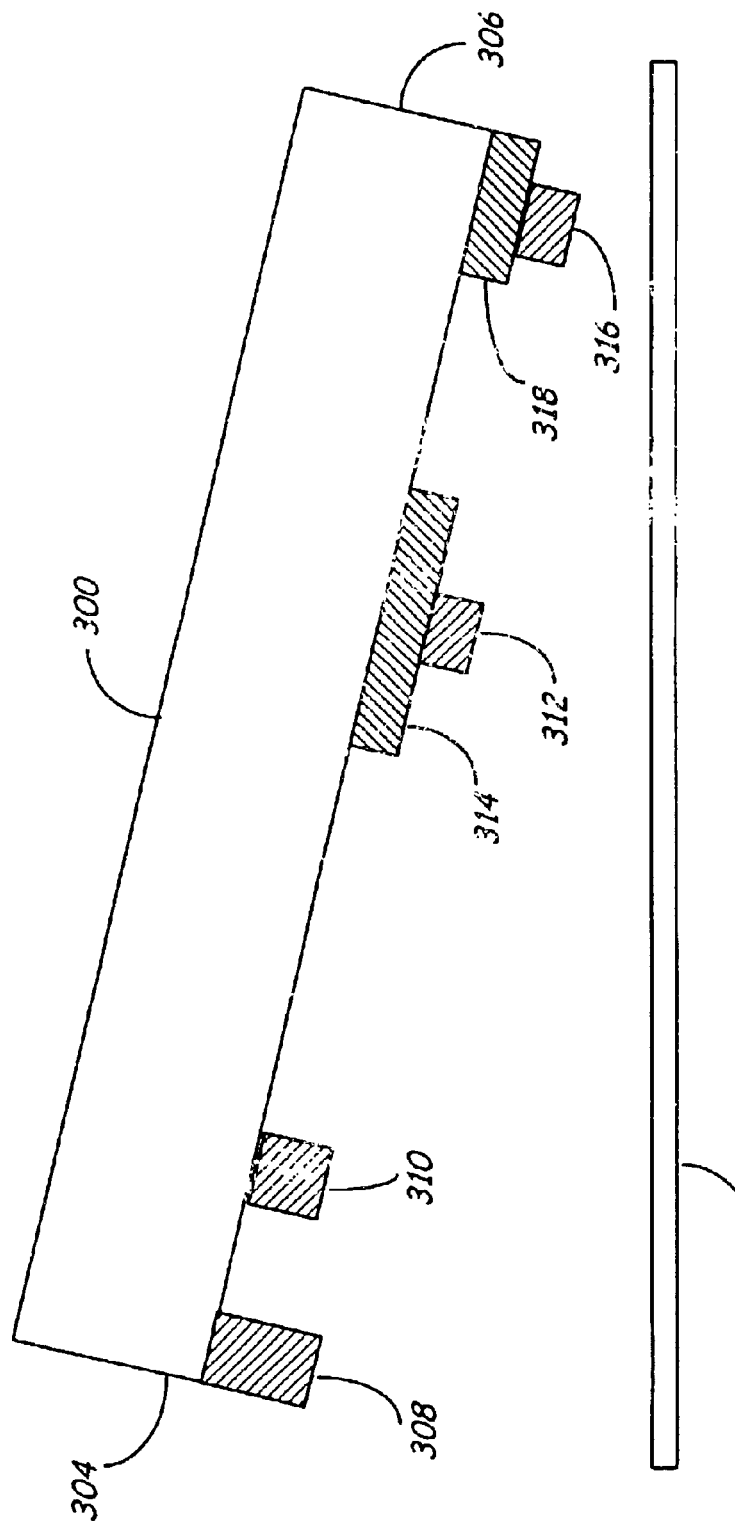
FIG. 3 illustrates a schematic side view of a slider including raised protrusions.

Placing protrusions or structures at different points on a slider can be used to prevent debris from entering between a slider and a disc and disrupting the slider and particularly a transducer carried by the slider. FIG. 3 schematically illustrates structures at different positions on slider 300. Slider 300 is illustratively designed to operate in a manner similar to the operation of slider 110 described in relation to FIG. 1. Slider 300 illustratively flies above disc 302 and includes leading edge 304 and trailing edge 306. Different structures can be placed on various parts of slider 300 to prevent debris from disrupting slider 300. These structures can be placed at various positions. Structures 308 and 310 are located proximate leading edge 304 and extend from slider 300 towards disc 302 to prevent particles from travelling towards trailing edge 306. As illustrated, the structures 308 and 310 can be of different heights. Structures 308 and 310 can also be of various shapes as described below. In addition, other structures may be located further away from leading edge 304 and near trailing edge 306 and be positioned on various features. For example, structure 312 is positioned on a side rail 314. In addition, structure 316 is positioned on a trailing pad 318.

Figure 4:
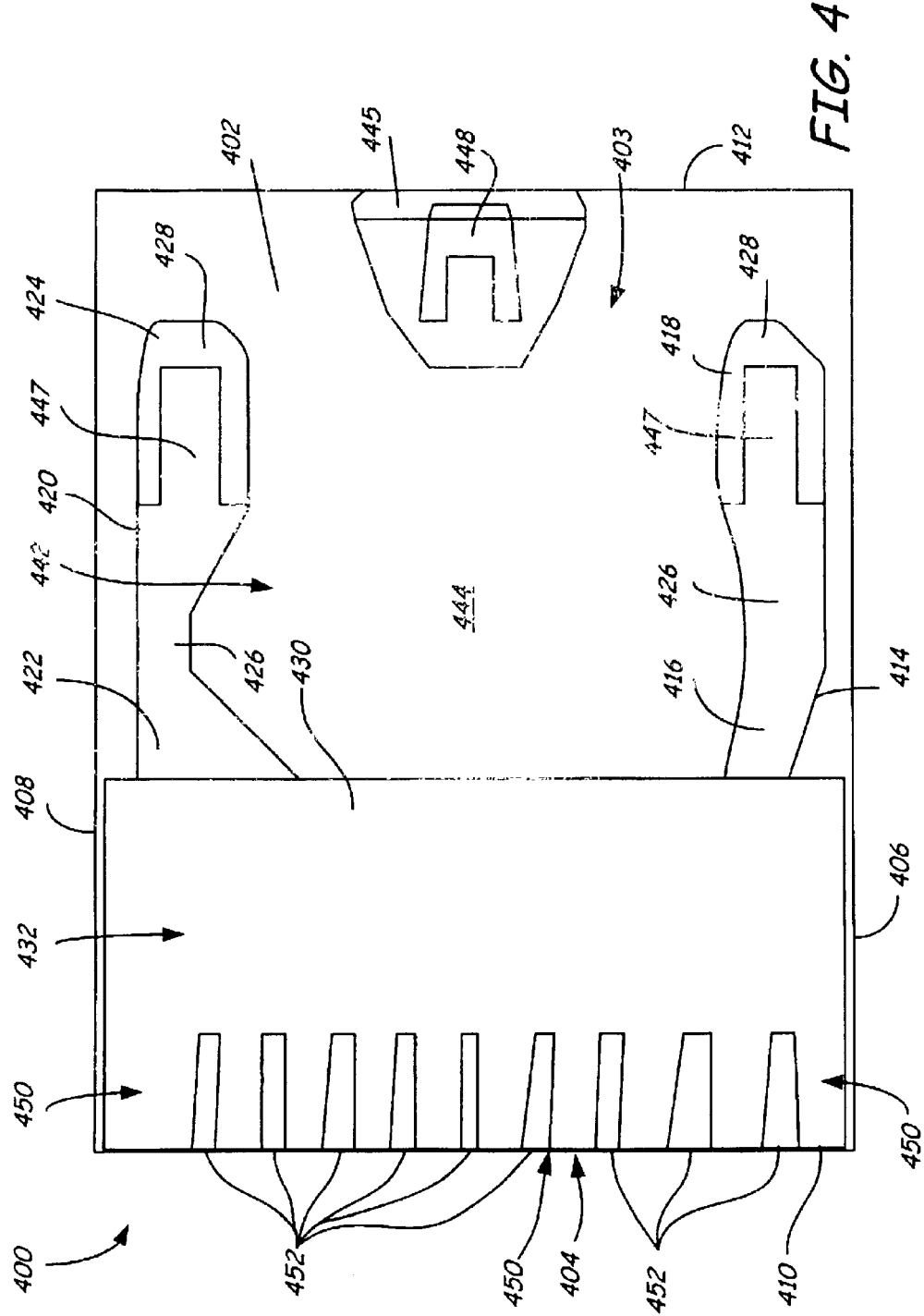
FIGS. 4–18 are plan views of sliders as viewed from a disc surface.

FIG. 4 is a plan view of slider 400 as viewed from the surface of a disc. Slider 400 is illustratively designed to operate in a manner similar to the operation of slider 110 described in relation to FIG. 1.

Slider 400 is formed of a substrate having a slider body 402 that includes a disc-facing surface 403. Disc-facing surface 403 includes an inside edge 406, an outside edge 408, a leading edge 410 and a trailing edge 412. Disc-facing surface 403 also includes a variety of features disposed between those edges. For example, disc-facing surface 403 includes an inside rail 414, an outside rail 420, a cavity dam 430, a sub-ambient pressure cavity 442, a center pad 445 and comb structure 404. Each of these disc-facing surface 403 features and various specific individual disc-facing surfaces associated therewith will be described in detail below. Disc-facing surface 403 includes an inside rail 414 extending towards trailing edge 412 that has a rail leading end 416 and a rail trailing end 418. Disc-facing surface 403 also includes an outside rail 420 extending towards trailing edge 412 that has a rail leading end 422 and a rail trailing end 424.

Inside rail 414 and outside rail 420 each have a rail step surface 426 that is generally positioned proximate rail leading ends 416 and 422 respectively. Inside rail 414 and outside rail 420 each also have a rail bearing surface 428 that is generally positioned proximate rail trailing ends 418 and 424 respectively. Generally speaking, rail step surfaces 426 are offset in depth from rail bearing surfaces 428. In other words, rail bearing surfaces 428 extend further towards the disc (i.e., disc 107 in FIG. 1) than do the rail step surfaces 426. Surfaces 426 have a deeper or greater depth than surfaces 428 (i.e., because surfaces 428 are bearing surfaces, they illustratively have a depth value of zero).

As is illustrated, a portion of each rail step surface 426 includes a convergent channel portion 447 that extends to a generally "U" shaped area within each rail bearing surface 428. Accordingly, considering the relative depths of rail step surfaces 426 and rail bearing surfaces 428, the rail bearing surfaces 428 are generally open to fluid flow (i.e., air flow) on their leading sides but generally closed to fluid flow on their trailing sides. During operation of slider 400 within a disc drive environment (i.e., see slider 110 in FIG. 1), the illustrated rail configuration illustratively causes a particular pattern of fluid flow (i.e., air flow) and therefore a particular resulting pressure pattern. The resulting pressure pattern illustratively aids at least in the control of the pitch and roll of slider 400 during operation and, depending on the nature of a given slider application, may be desirable for other reasons related to slider operational performance.

It should be noted that the illustrated configuration of rail surfaces 426 and 428 is not critical to the present invention. In accordance with one embodiment, surfaces 426 and 428 have the same depth such that rails 414 and 420 present one generally continuous bearing surface (one for each rail) having a single depth (i.e., the entire rails 414 and 420 each include a single disc-facing surface that generally has the same depth as one of the surfaces 428). Such a configuration would present a different pressure pattern during operation, as compared to the illustrated configuration.

In accordance with another embodiment, surfaces 426 and 428 have the same depth such that rails 414 and 420 present one generally continuous surface (one for each rail) that is positioned at a step depth (i.e., the entire rails 414 and 420 each include a single disc-facing surface that generally has the same depth as one of the surfaces 426). Such a configuration would present yet a different pressure pattern during operation. Different pressure patterns might be desirable depending on the nature of a given slider application and/or slider environment. The specifically described rail surface configurations and other rail surface configurations should be considered within the scope of the present invention.

Disc-facing surface 403 also includes a cavity dam 430 that illustratively, although not necessarily, abuts rails 414 and 420. Cavity dam 430 has a cavity dam upper surface 432 that illustratively, although not necessarily, forms a bearing surface.

Disc-facing surface 403 further includes a center pad (or rail) 445. Center pad 445 is illustratively, although not necessarily, positioned proximate trailing edge 412 in a location that is generally centered along that edge. Center pad 445 includes a center step surface 446 and a center bearing surface 448. Generally speaking, center step surface 446 is offset in depth from center bearing surface 448. In other words, center bearing surface 448 extends further towards the disc (i.e., disc 107 in FIG. 1) than does center step surface 446. Surface 446 has a greater or deeper depth than surface 448 (i.e., because surface 448 is a bearing surface, it illustratively has a depth value of zero). The depth of center step surface 446 illustratively may be the same or different than the depths of surfaces 426.

As is illustrated, a portion of step surface 446 extends into a generally "U" shaped center bearing surface 448. Accordingly, considering the relative depths of center step surface 446 and center bearing surface 448, the center bearing surface 448 is generally open to fluid flow (i.e., airflow) on its leading side but generally closed to fluid flow on its trailing side. Such a configuration causes a particular pattern of fluid flow (i.e., airflow), and therefore a particular resulting pressure pattern during operation. As was stated above, different pressure patterns might be desirable depending upon the particular slider application. The illustrated center pad 445 will illustratively present one particular pressure pattern that might advantageously aid in the control of slider 400 depending on a given slider application. It should be emphasized that the generally "U" shaped center bearing surface 448 could have any of a variety of shapes without departing from the scope of the present invention. For example, center bearing surface could alternatively be a square pad, a round pad, generally "J" shaped, or have some other of a wide variety of shapes. The specific shapes stated herein should be considered examples only. Other shapes should be considered within the scope of the present invention.

It should be noted that the illustrated configuration of center pad 445 is not critical to the present invention. Other configurations that present other pressure patterns could be utilized. Different pressure patterns might be desirable depending on the nature of a given slider application and/or slider environment. The specifically described configuration and other configurations should be considered within the scope of the present invention. It should be noted that disc head slider 400 (as well as the other slider embodiments described below) will also typically include a read/write transducer (not shown) positioned in one of a variety of potential locations on or proximate disc-facing surface 403, such as proximate center pad 445. The precise location of the transducer is not critical to the present invention. Illustratively, certain center pad 445 configurations, rail 414/420 configurations, etc. might be selected to compliment and add performance benefits to a particular placement of a read/write transducer.

Disc-facing surface 403 further includes a sub-ambient pressure cavity 442 that is generally positioned between inside rail 414, outside rail 420 and cavity dam 430 and illustratively, although not necessarily, extends to trailing edge 412. Sub-ambient pressure cavity 442 includes a cavity floor 444.

In accordance with one aspect of the present invention, slider 400 is designed as to be particularly insensitive to contamination particles encountered during the operation of slider 400 within a disc drive environment. In particular, slider 400 is designed to discourage an accumulation of contamination particles near the trailing edge bearing surface (bearing surface 448) of slider 400, typically the transducer region of the slider. Illustratively, by incorporating comb structure 404, the mass flow pattern under slider 400 during operation can be manipulated to prevent particles from reaching sub-ambient pressure cavity 442 and center bearing surface 448 at trailing edge 412.

Comb structure 404 allows sufficient airflow to pressurize and provide a lift force to the slider 400 while reducing the probability of larger particles entering between slider 400 and a disc. In this embodiment, comb structure 404 includes a plurality of raised protrusions 450 positioned proximate and parallel to leading edge 410. In this embodiment, the plurality of raised protrusions 450 are cut out from the cavity dam 430 and are coplanar to surface 432 (and thus have a depth of zero). The plurality of raised protrusions form gaps 452 throughout the leading edge 410. Gaps 452 allow airflow to pass between the plurality of raised protrusions 450 and toward cavity dam 430. The plurality of raised protrusions 450 are of similar shape and size and block particles from traveling towards trailing edge 412. Illustratively, gaps 452 are of similar depth to rail surfaces 426, although other depths may be used. Typically, gaps 452 are recessed from the plurality of raised protrusions by a depth in the range of about 0.1 to 0.5 microns.

Slider 400 is but one illustrative example of many potential embodiments of the present invention. General concepts of the present invention could be applied to generate other configurations that are also embodiments within the scope of the present invention. The most appropriate configuration is application-specific and depends at least on the particular environmental considerations associated with a given slider application. Generally, when reference is made to the plurality of raised protrusions being parallel to the leading edge, the plurality of raised protrusions are formed in a row parallel to the leading edge. The plurality of raised protrusions themselves may or may not be parallel to the leading edge. Comb structure 404 can be of varying shapes and sizes to block particles yet allow sufficient airflow to pressurize the slider. In one embodiment, the plurality of raised protrusions are of similar size and shape and equally spaced about the leading edge. The gaps can be spaced apart at regular intervals and of similar width throughout the leading edge. Thus, the comb structure possesses advantages over a wall since the gaps provide openings for airflow, resulting in more pressurization and stabilization of the slider, particularly proximate the leading edge and when operating the slider from a stopped position.

Furthermore, the plurality of raised protrusions may extend to be above or generally coplanar with an air bearing surface plane, which allows the plurality of raised protrusions to block a greater amount of particles. Also, multiple rows of protrusions may be used. The density of raised protrusions may also vary depending on different factors. In one embodiment, the raised protrusions cover around 20–80% of the leading edge. Several additional illustrative embodiments are discussed below in relation to FIGS. 5–18.

Figure 5:
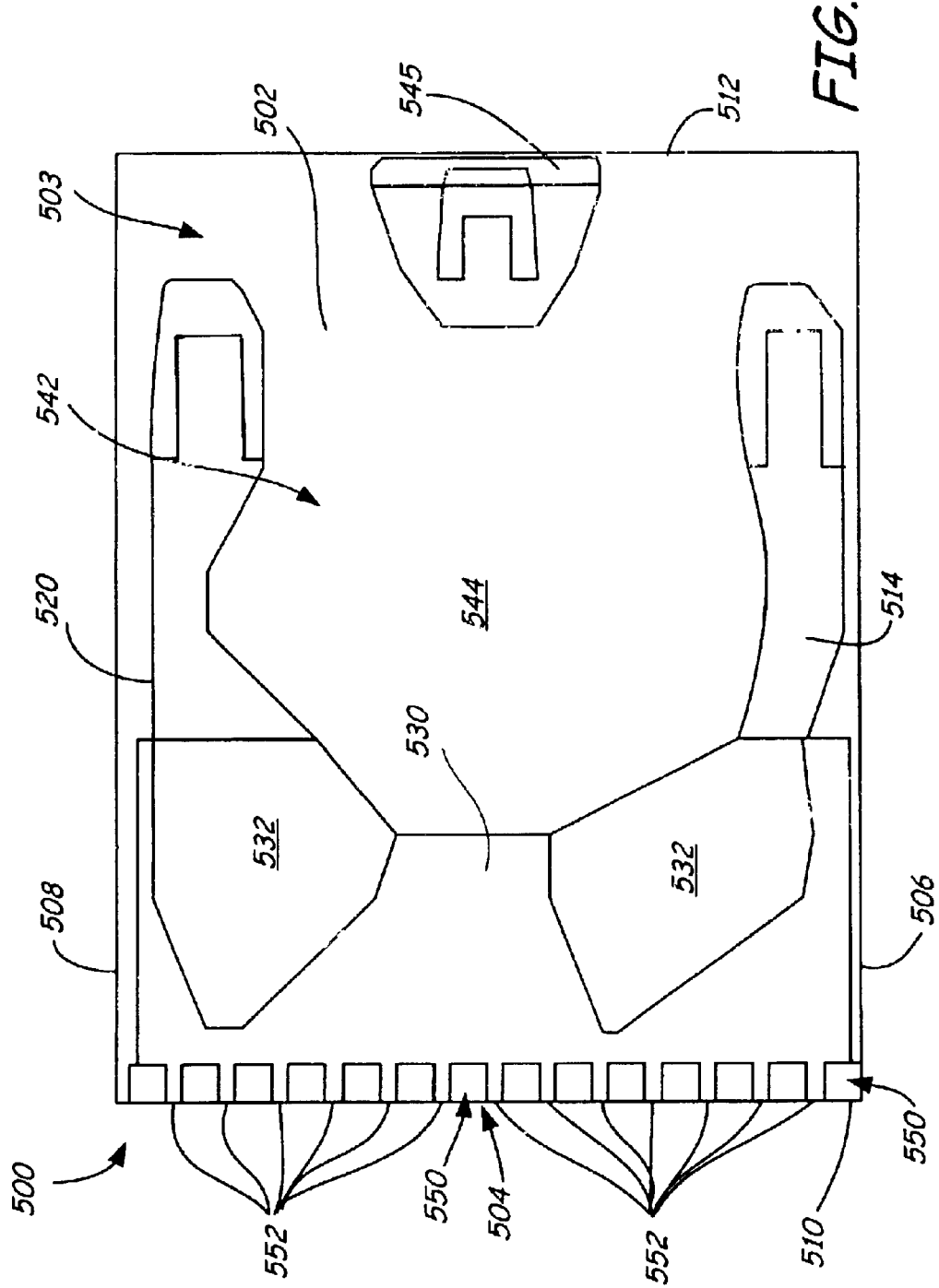

FIG. 5 is a plan view of a slider 500 in accordance with another illustrative embodiment of the present invention. Within FIG. 5, elements that are the same or substantially similar to elements described in relation to slider 400 (FIG. 4) are similarly or identically labeled. Slider 500 is illustratively designed to operate in a manner similar to the operation of slider 110 described in relation to FIG. 1.

Slider 500 is formed of a substrate having a slider body 502 that includes a slider disc-facing surface 503. Slider disc-facing surface 503 includes an inside edge 506 and an outside edge 508, a leading edge 510 and a trailing edge 512. Disc-facing surface 503 also includes a variety of features disposed between those edges.

Slider 500 is illustratively configured in a manner that is substantially similar to slider 400. For example, slider 500 similarly includes an inside rail 514, an outside rail 520, a sub-ambient pressure cavity 542, a cavity floor 544 and a center pad 545 that are generally configured similar to the corresponding elements described above in relation to FIG. 4. Slider 500 also includes comb structure 504 and a cavity dam 530. Cavity dam 530 includes raised surfaces 532 positioned proximate rails 514 and 520.

In this embodiment, comb structure 504 includes a plurality of raised protrusions 550 arranged proximate and substantially parallel to leading edge 510. The plurality of raised protrusions 550 are isolated, rectangular shaped pads and extend above cavity dam 530 to a level similar to raised surfaces 532. The plurality of raised protrusions 550 further form gaps 552 that allow airflow to pressurize slider 500. Gaps 552 are generally coplanar with cavity dam 530.

Figure 6:
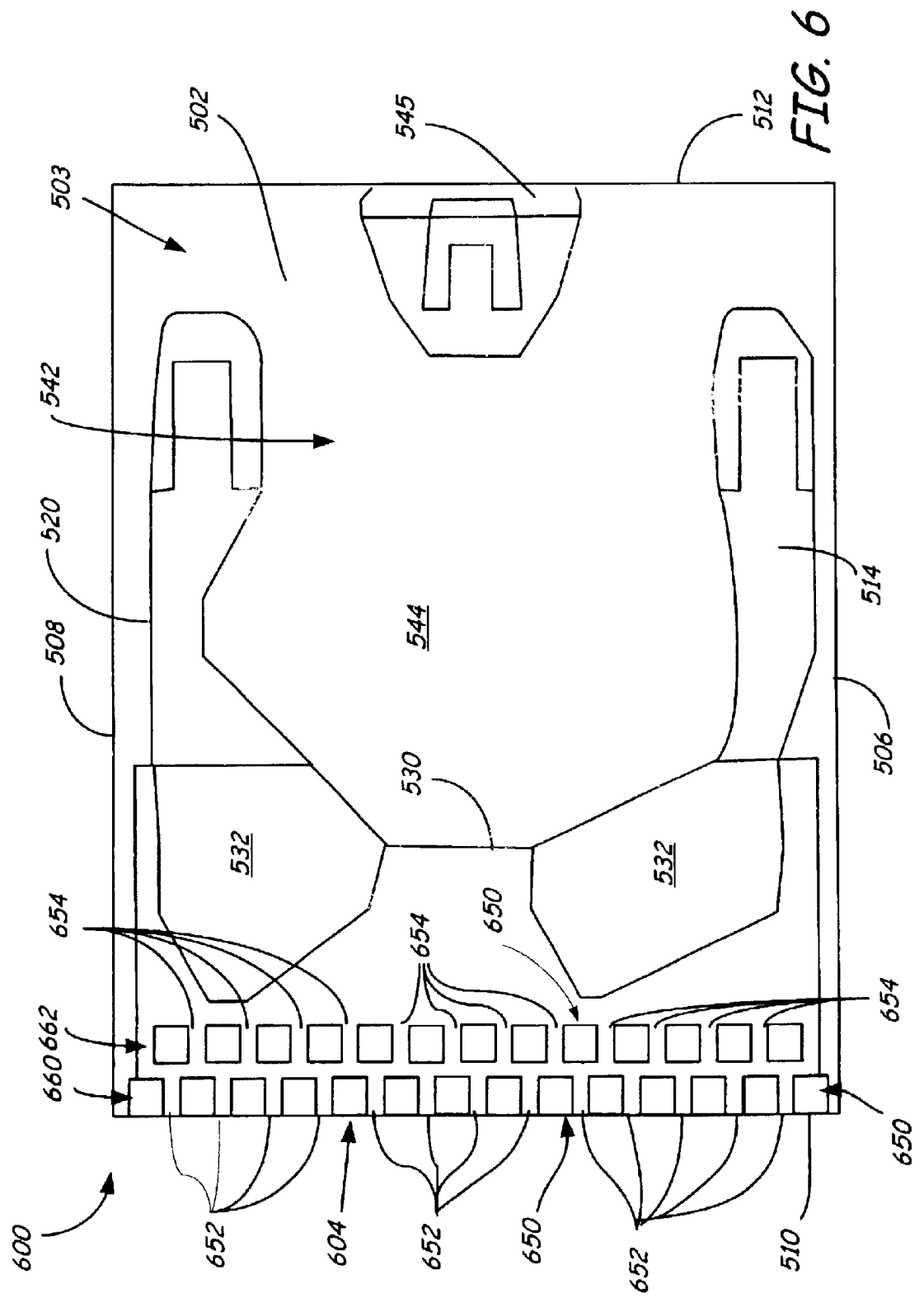

FIG. 6 shows a slider 600 that is substantially similar to slider 500, shown in FIG. 5, and includes similarly numbered features. In this embodiment, a multiple-row comb structure 604 is illustrated. Comb structure 604 includes a plurality of raised protrusions 650. The plurality of raised protrusions 650 are arranged proximate and substantially parallel to leading edge 510. In addition, the plurality of raised protrusions 650 form gaps 652 and 654 that allow airflow to pressurize slider 600. The plurality of raised protrusions 650 are isolated pads and arranged in a first row 660 and a second row 662. The second row 662 is positioned further away from the leading edge 510 than the first row 660. In addition, the second row 662 blocks fluid flow from gaps 652 in first row 660. This further helps block debris that may pass through gaps 652.

Figure 7:
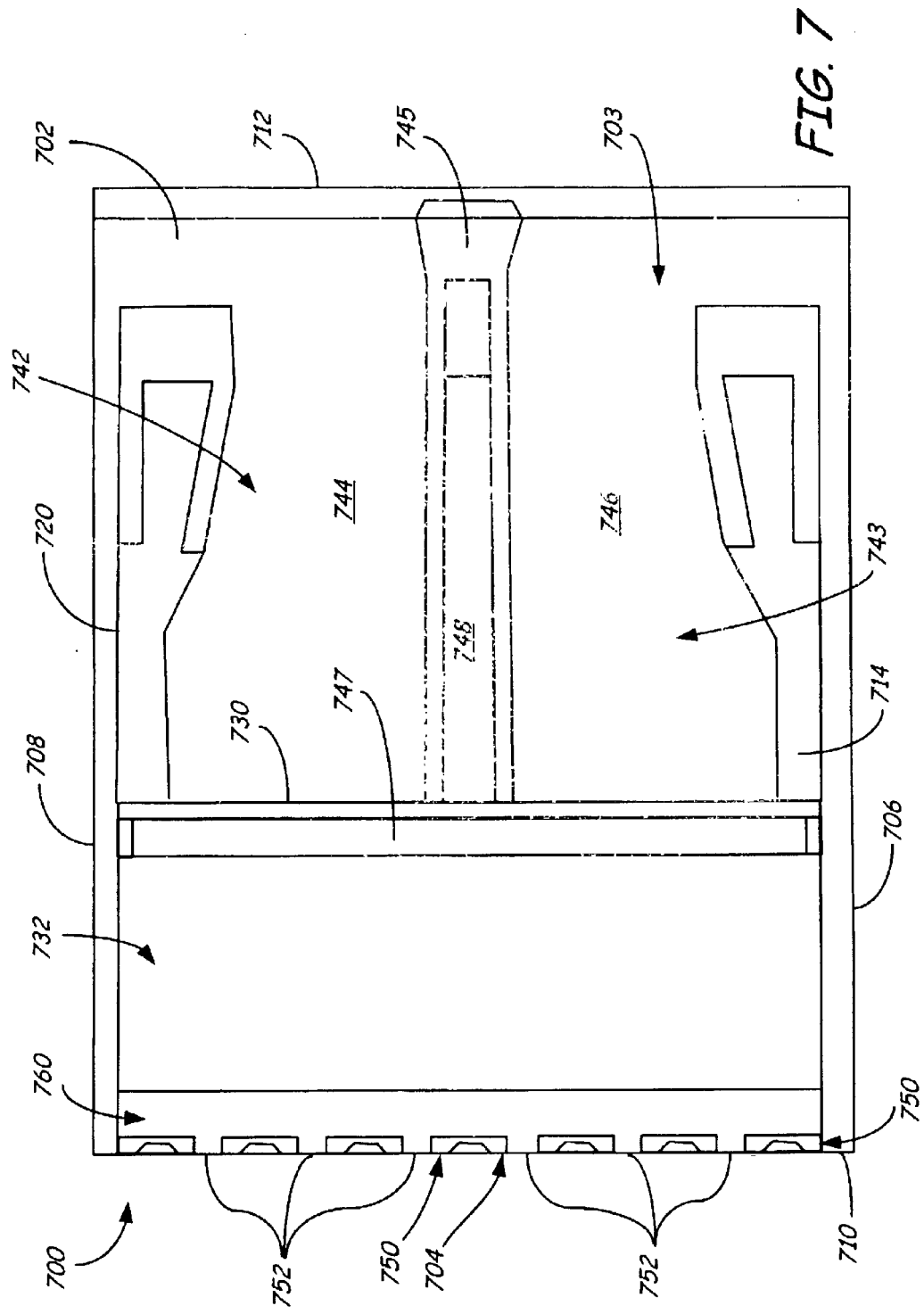

FIG. 7 is a plan view of a slider 700 in accordance with another illustrative embodiment of the present invention. Within FIG. 7, elements that are the same or substantially similar to elements described in relation to slider 400 (FIG. 4) are similarly or identically labeled. Slider 700 is illustratively designed to operate in a manner similar to the operation of slider 110 described in relation to FIG. 1.

Slider 700 is formed of a substrate having a slider body 702 that includes a slider disc-facing surface 703. Slider disc-facing surface 703 includes an inside edge 706 and an outside edge 708, a leading edge 710 and a trailing edge 712. Disc-facing surface 703 also includes a variety of features disposed between those edges.

Slider 700 is illustratively configured in a manner that is substantially similar to slider 400. For example, slider 700 similarly includes an inside rail 714 and an outside rail 720 that are generally configured similar to the corresponding elements described above in relation to FIG. 4. Slider 700 also includes comb structure 704, a cavity dam 730, two sub ambient pressure cavities 742, 743, two cavity floors 744, 746 and a center rail 745. Cavity dam 730 includes a top surface 732 and a channel 747 parallel to leading edge 710. Additionally, center rail 745 includes a channel 748 perpendicular to leading edge 710.

In this embodiment, comb structure 704 includes a plurality of raised protrusions 750 arranged proximate and substantially parallel to leading edge 710. The plurality of raised protrusions 750 are isolated, cup shaped pads having openings facing leading edge 710 and are coplanar with cavity dam 730. The general cup shape allows for better pressurization and trapping of particles. In particular, the opening of the cup allows airflow to provide a lifting force to slider 700 and catch particles that reach the leading edge. The cup opening can also allow the plurality of protrusions 750 to cover more of the leading edge, which in turn blocks more particles. The plurality of raised protrusions 750 further form gaps 752 that allow airflow to pressurize slider 700. Gaps 752 are generally coplanar with a recessed surface 760 positioned between cavity dam 730 and comb structure 704.

Figure 8:
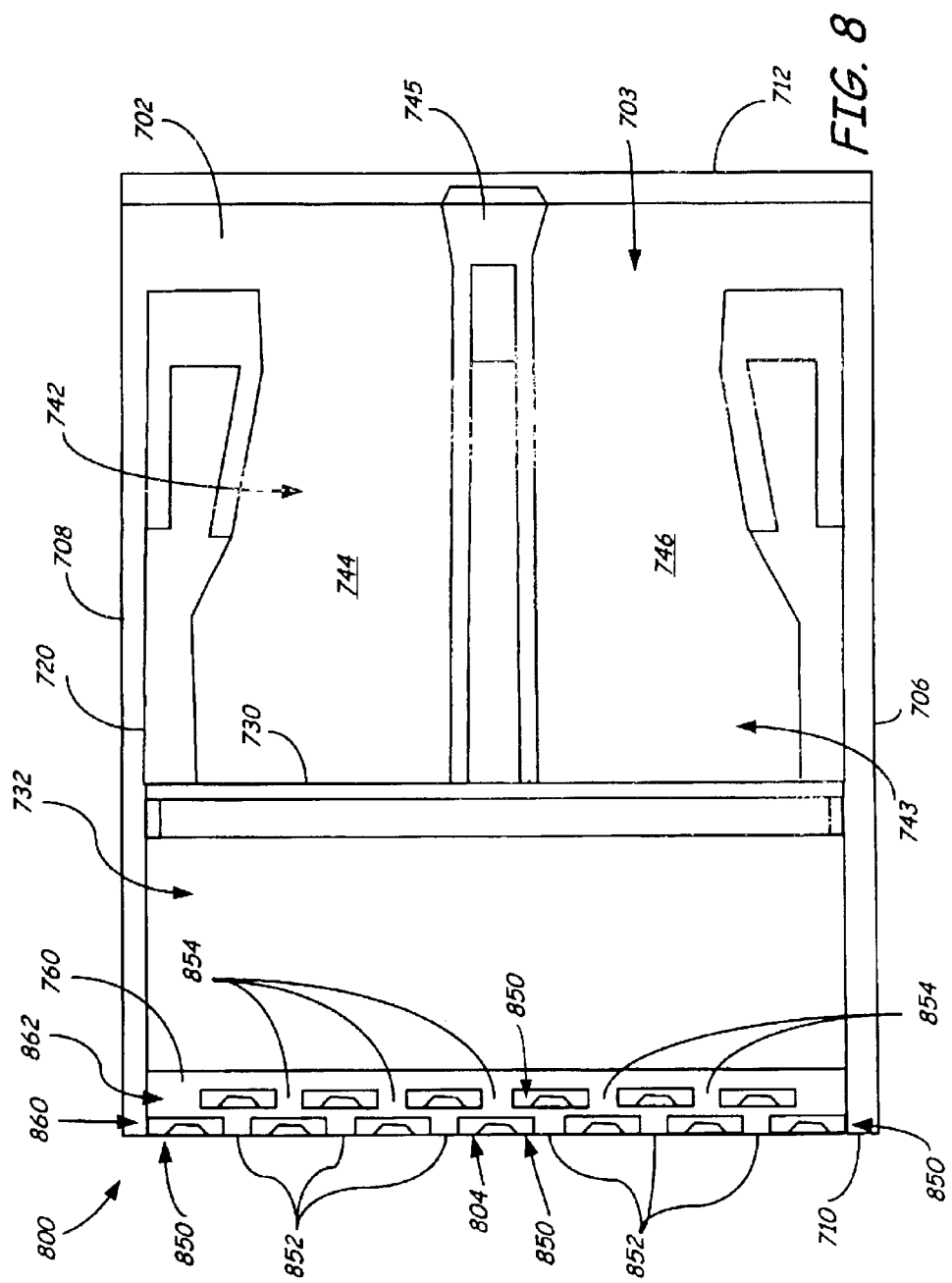

FIG. 8 shows a slider 800 that is substantially similar to slider 700, shown in FIG. 7, and includes similarly numbered features. In this embodiment, a multiple-row comb structure 804 is illustrated. Comb structure 804 includes a plurality of raised protrusions 850. The plurality of raised protrusions 850 are arranged proximate and substantially parallel to leading edge 710. In addition, the plurality of raised protrusions 850 are cup-shaped and form gaps 852 and 854 that allow airflow to pressurize slider 800. The plurality of raised protrusions 850 are further arranged in a first row 860 and a second row 862. The second row 862 is positioned further away from the leading edge 710 than the first row 860. In addition, the second row 862 further acts to block fluid flow and consequently debris that passes through gaps 852.

Figure 9:
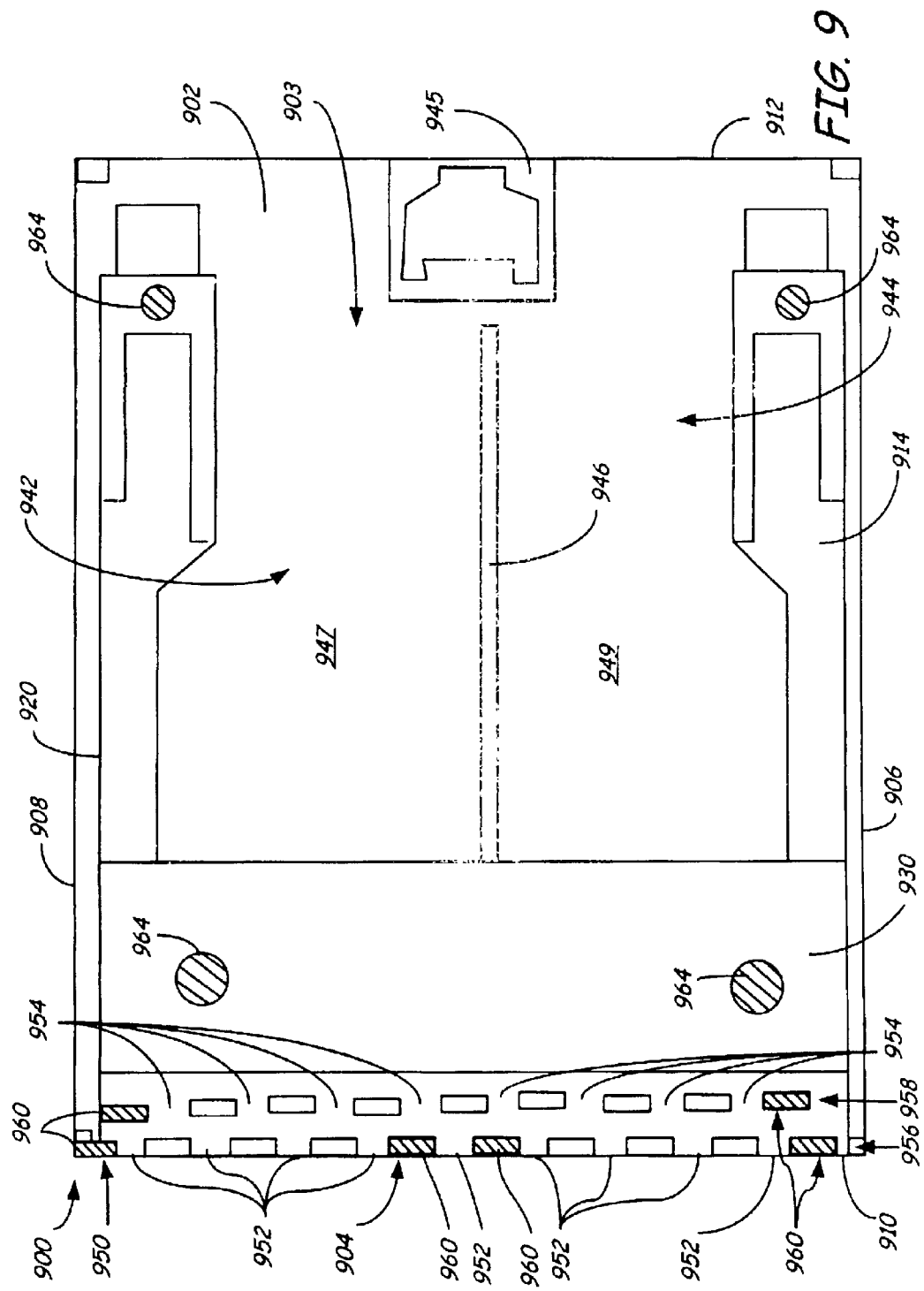

FIG. 9 is a plan view of a slider 900 in accordance with another illustrative embodiment of the present invention. Within FIG. 9, elements that are the same or substantially similar to elements described in relation to slider 400 (FIG. 4) are similarly or identically labeled. Slider 900 is illustratively designed to operate in a manner similar to the operation of slider 110 described in relation to FIG. 1.

Slider 900 is formed of a substrate having a slider body 902 that includes a slider disc-facing surface 903. Slider disc-facing surface 903 includes an inside edge 906 and an outside edge 908, a leading edge 910 and a trailing edge 912. Disc-facing surface 903 also includes a variety of features disposed between those edges.

Slider 900 is illustratively configured in a manner that is substantially similar to slider 400. For example, slider 900 similarly includes an inside rail 914, an outside rail 920, a cavity dam 930 and a center pad 945 that are generally configured similar to the corresponding elements described above in relation to FIG. 4. Slider 900 further includes a center rail 946 forming sub ambient pressure cavities 942 and 944 having two cavity floors 947 and 949.

In this embodiment, comb structure 904 includes a plurality of raised protrusions 950 arranged in two rows 956, 958 proximate and substantially parallel to leading edge 910. The plurality of raised protrusions 950 are rectangular shaped. The plurality of raised protrusions 950 further form gaps 952 and 954 that allow airflow to pressurize slider 900.

Generally, the plurality of raised protrusions 950 are coplanar with cavity dam 930. However, coating 960 is applied to some of the plurality of raised protrusions and consequently, the coating 960 is raised above cavity dam 930 and typically include a coating such as diamond-like-carbon (DLC). The DLC coating 960 further traps debris and protects a disc surface and reduces stiction of the slider during takeoff. Also, pads 964 are provided with DLC coating, if desired.

Figure 10:
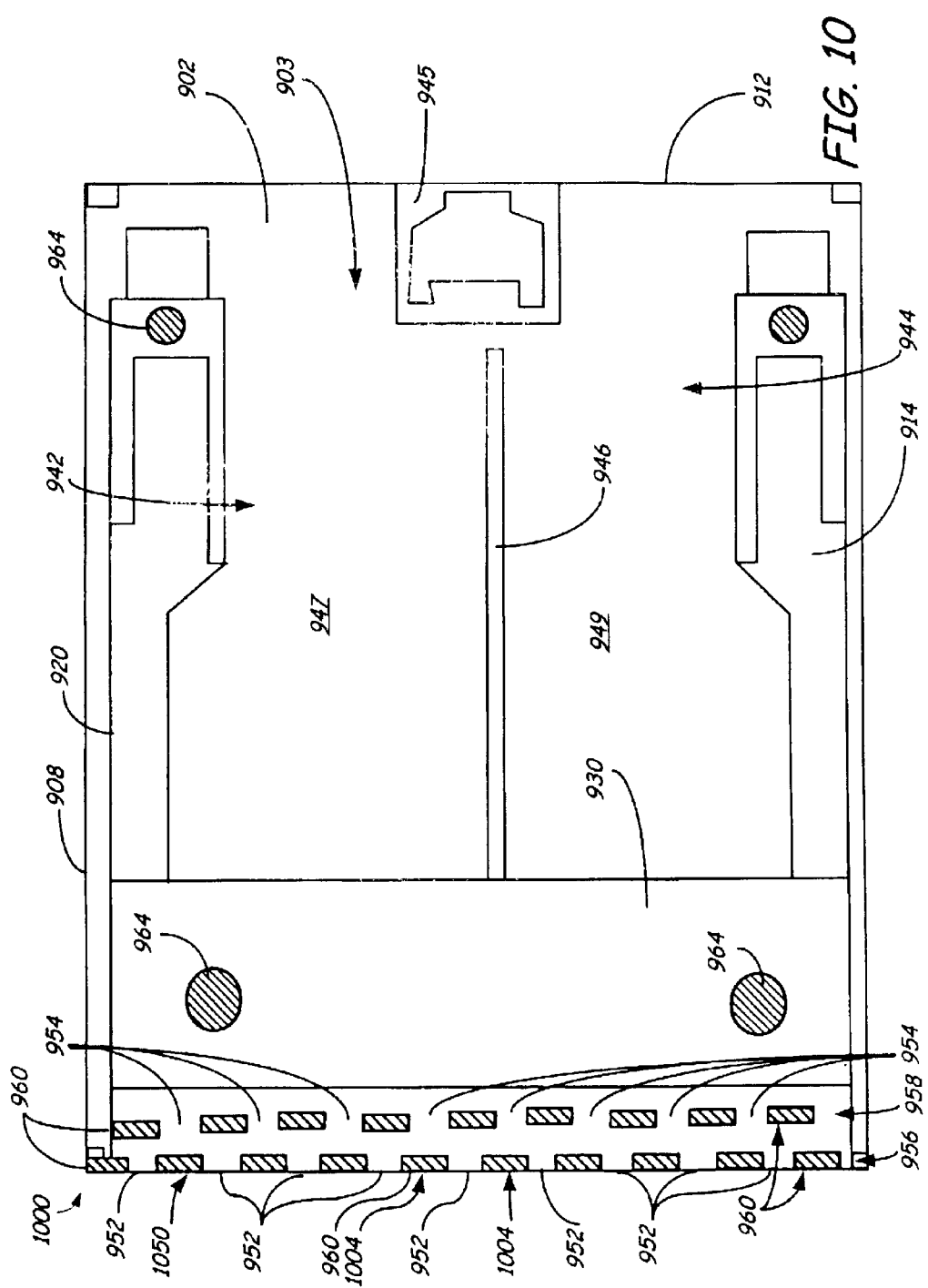

FIG. 10 shows a slider 1000 that is substantially similar to slider 900, shown in FIG. 9, and includes similarly numbered features. In this embodiment, a multiple-row comb structure 1004 is illustrated. Comb structure 1004 includes a plurality of raised protrusions 1050 that each have DLC coating that extends above cavity dam 930, which further prevents contaminants from reaching trailing edge 912.

As appreciated by those skilled in the art, other features and structures may be applied to a slider to prevent particle contamination. FIGS. 11–18 illustrate several embodiments having additional debris removing features.

Figure 11:
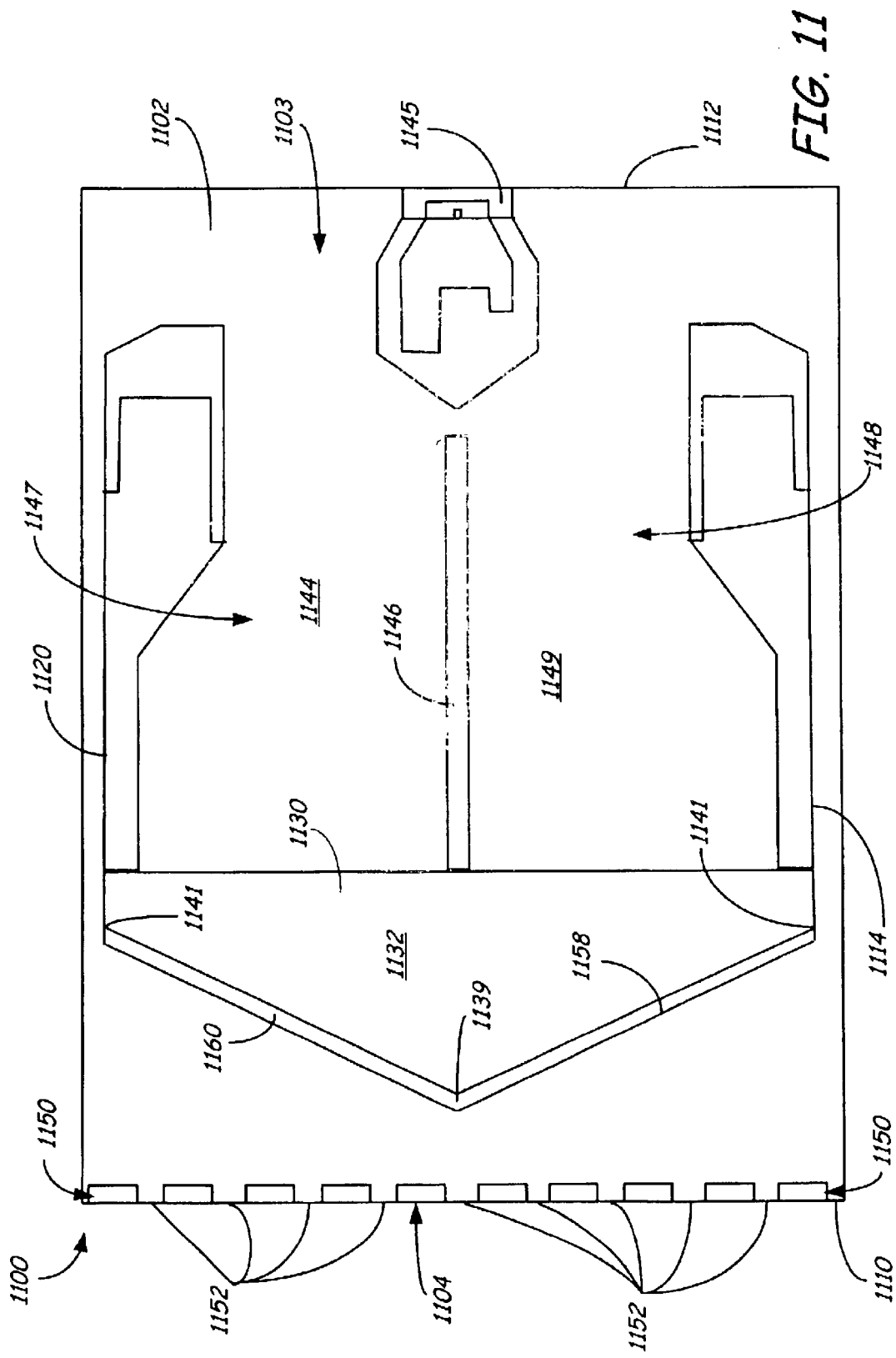

FIG. 11 is a plan view of a slider 1100 in accordance with another illustrative embodiment of the present invention. Within FIG. 11, elements that are the same or substantially similar to elements described in relation to slider 400 (FIG. 4) are similarly or identically labeled. Slider 1100 is illustratively designed to operate in a manner similar to the operation of slider 110 described in relation to FIG. 1.

Slider 1100 is formed of a substrate having a slider body 1102 that includes a slider disc-facing surface 1103. Slider disc-facing surface 1103 includes an inside edge 1106 and an outside edge 1108, a leading edge 1110 and a trailing edge 1112. Disc-facing surface 1103 also includes a variety of features disposed between those edges.

Slider 1100 is illustratively configured in a manner that is substantially similar to slider 400. For example, slider 1100 similarly includes an inside rail 1114, an outside rail 1120 and a center pad 1145 that are generally configured similar to the corresponding elements described above in relation to FIG. 4. Slider 1100 also includes a cavity dam 1130 having an upper surface 1132, center rail 1146, two sub-ambient pressure cavities 1147,1148 and two cavity floors 1144 and 1149.

In this embodiment, comb structure 1104 includes a plurality of raised protrusions 1150 arranged proximate and substantially parallel to leading edge 1110. The plurality of raised protrusions 1150 are rectangular shaped and coplanar with surface 1132. The plurality of raised protrusions 1150 further form gaps 1152 that allow airflow to pressurize slider 1100.

Slider disc-facing surface 1103 includes a cavity dam 1130 that illustratively, although not necessarily, abuts rails 1114 and 1120. Cavity dam 1130 has a cavity dam upper surface 1132 that illustratively, although not necessarily, forms a bearing surface. Cavity dam 1130 further includes an angled cavity dam upper surface leading edge 1158 that is generally angled from a cavity dam upper surface middle point 1139 to two cavity dam upper surface side corner points 1141. Side corner points 1141 are generally further displaced from leading edge 1110 than middle point 1139. In addition, an angled wall 1160 is provided that extends above surface 1132 and further blocks debris. Generally, wall 1160 is made of DLC and is of similar shape to leading edge 1158 of cavity dam 1130. The wall 1160 further helps to divert particles toward inside edge 1106 and outside edge 1108.

Figure 12:
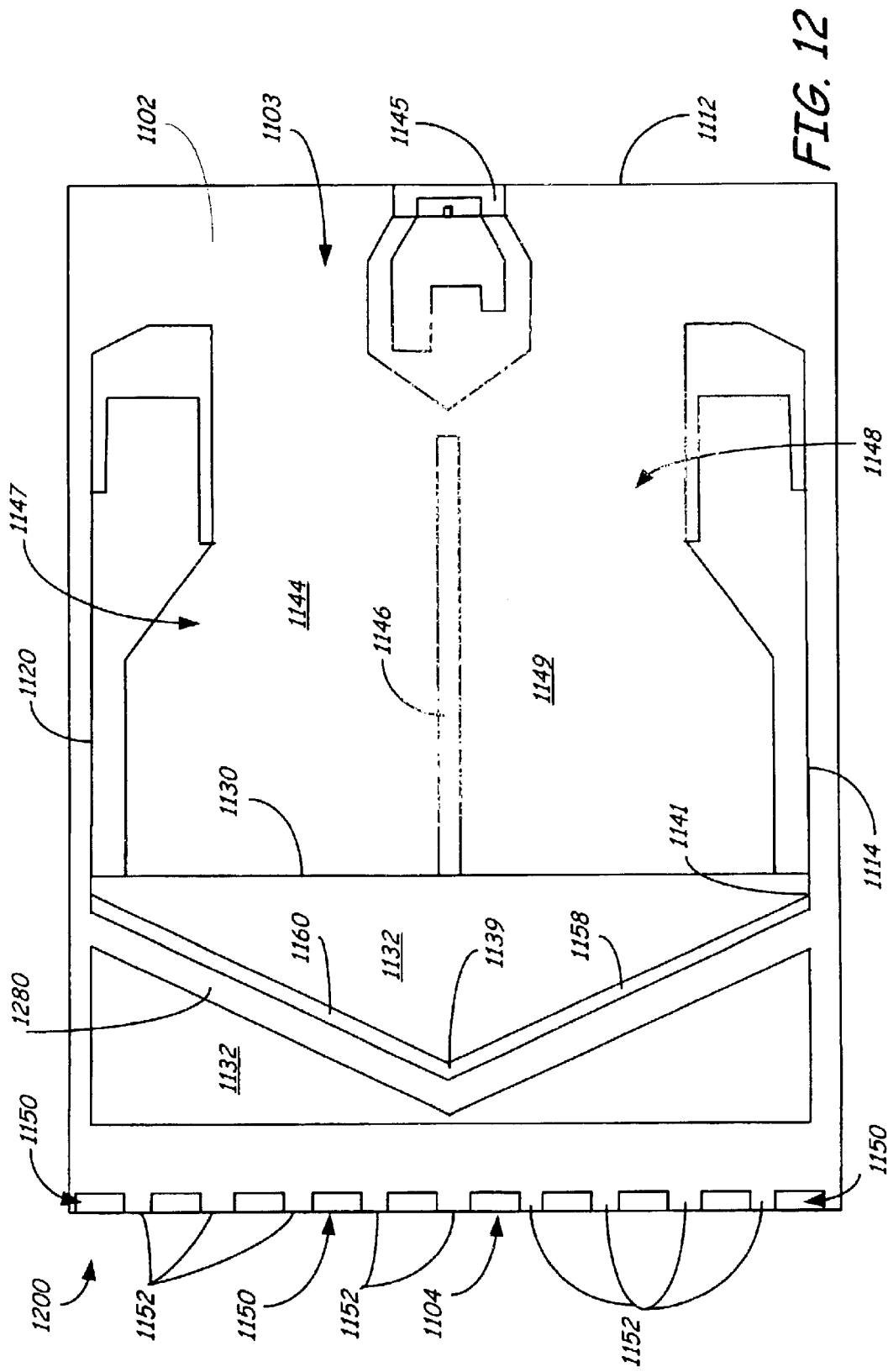

FIG. 12 shows a slider 1200 that is substantially similar to slider 1100, shown in FIG. 11, and includes similarly numbered features. In this embodiment, a channel 1280 has been positioned in front of angled wall 1160 to additionally trap particles and divert then towards inside edge 1106 and outside edge 1108.

Figure 13:
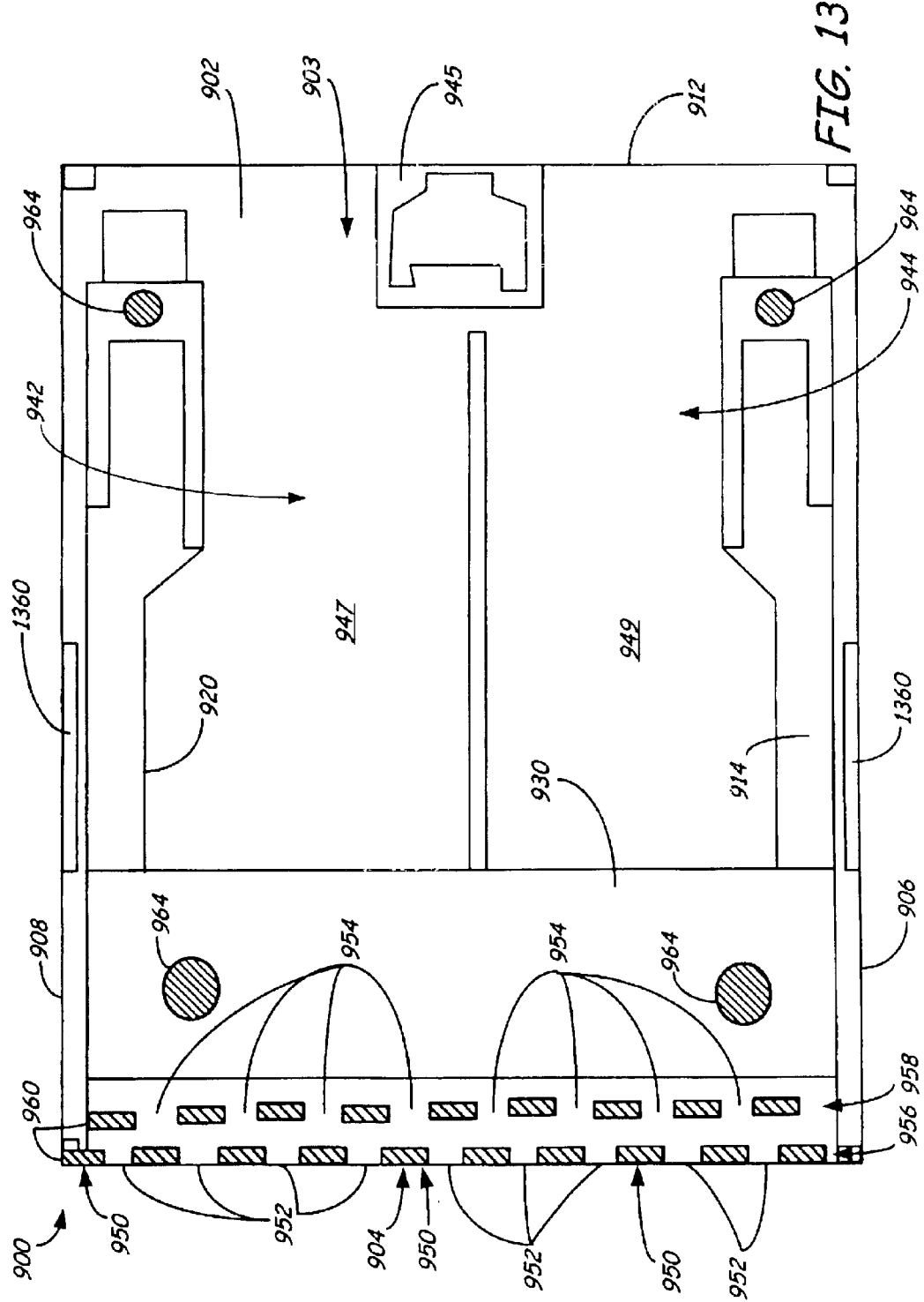

FIG. 13 is a plan view of a slider 1300 in accordance with another illustrative embodiment of the present invention. Within FIG. 13, elements that are the same or substantially similar to elements described in relation to slider 900 (FIG. 9) are similarly or identically labeled. Slider 1300 is illustratively designed to operate in a manner similar to the operation of slider 110 described in relation to FIG. 1. In addition to the features of slider 900, slider 1300 includes side walls 1360. Side walls 1360 are positioned on inside edge 906 and outside edge 908. Illustratively, side walls 1360 have a depth of zero and thus are disposed within a bearing surface plane. Other heights of side walls 1360 may be used.

Figure 14:
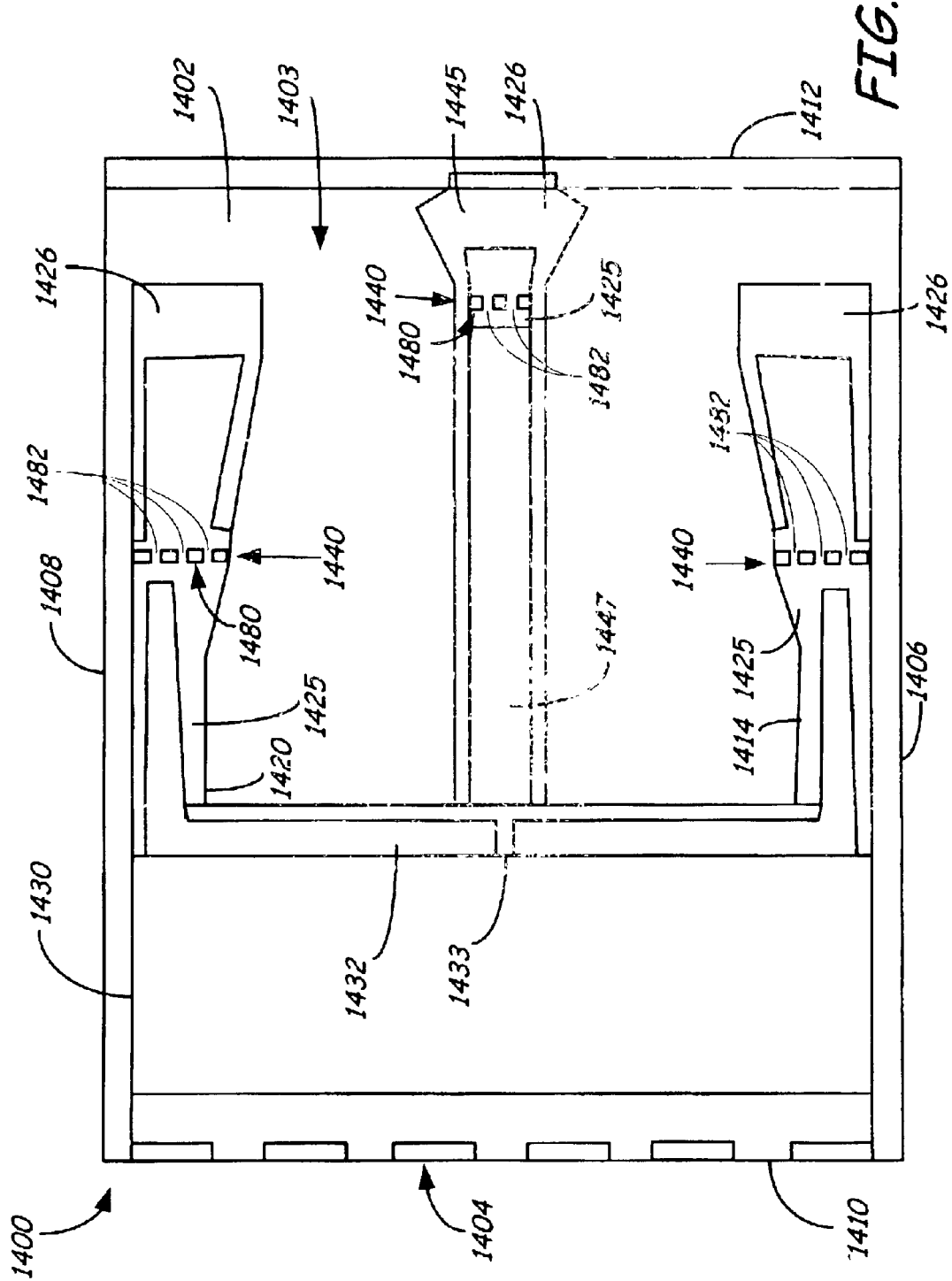
Figure 15:
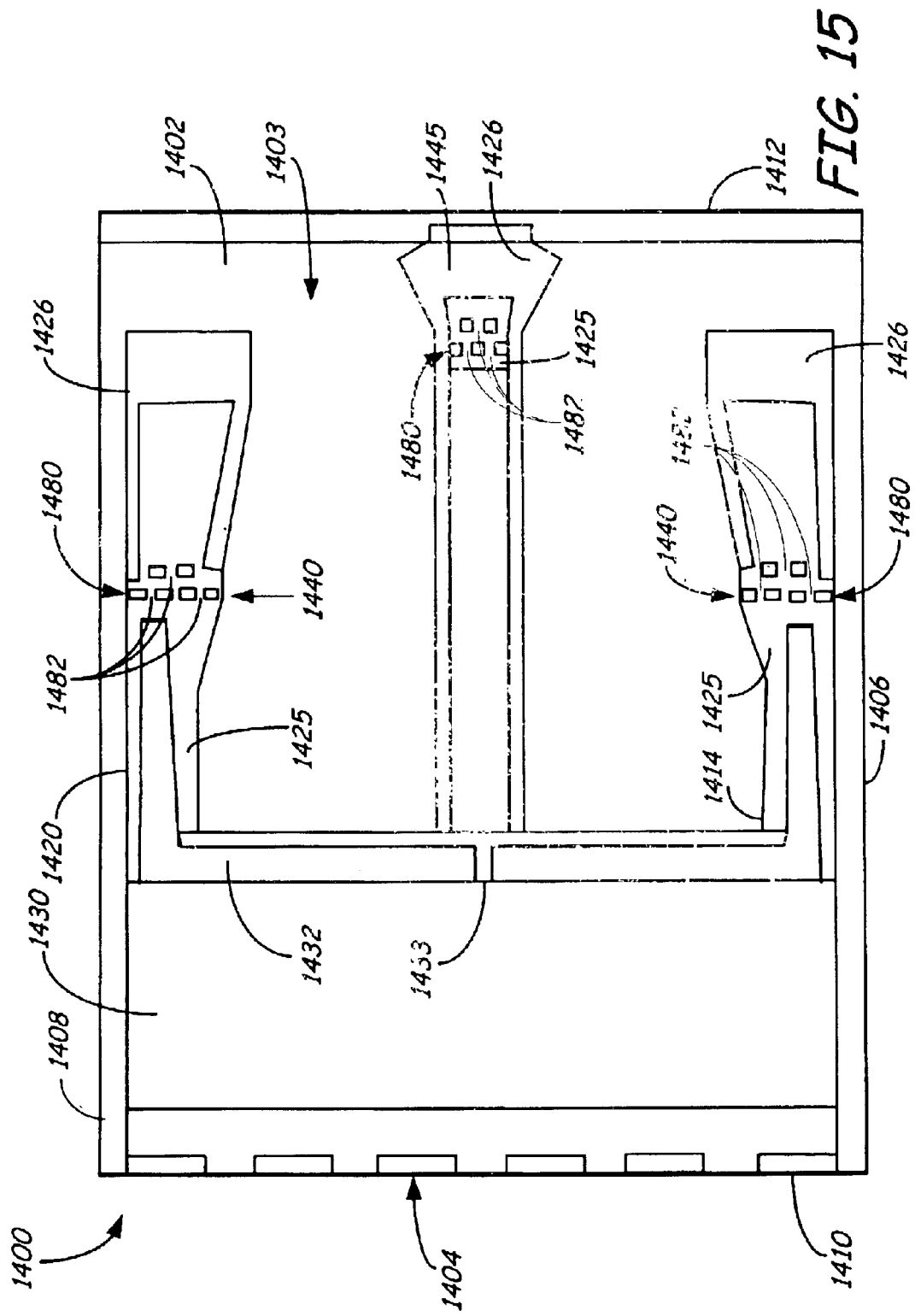

FIGS. 14 and 15 are plan views of a slider 1400 in accordance with illustrative embodiments of the present invention. Within FIGS. 14 and 15, elements that are the same or substantially similar to elements described in relation to slider 400 (FIG. 4) are similarly or identically labeled. Slider 1400 is illustratively designed to operate in a manner similar to the operation of slider 110 described in relation to FIG. 1.

Slider 1400 is formed of a substrate having a slider body 1402 that includes a slider disc-facing surface 1403. Slider disc-facing surface 1403 includes an inside edge 1406 and an outside edge 1408, a leading edge 1410 and a trailing edge 1412. Disc-facing surface 1403 also includes a variety of features disposed between those edges.

Slider 1400 is illustratively configured in a manner that is substantially similar to slider 400. For example, slider 1400 similarly includes an inside rail 1414 and an outside rail 1420 that are generally configured similar to the corresponding elements described above in relation to FIG. 4. Slider 1400 also includes comb structure 1404, a cavity dam 1430 and center rail 1445. Inside rail 1414, outside rail 1420 and center rail 1445 include recessed surfaces 1425 and raised bearing surfaces 1426. In addition, comb structures 1440 are placed on each of the rails in front of bearing surfaces 1426. Comb structures 1440 include a plurality of raised protrusions 1480 illustratively coplanar with bearing surfaces 1426. The plurality of raised protrusions 1480 form gaps 1482 that help pressurize slider 1400.

A channel 1432 extends from a center point 1433 towards inside edge 1406 and outside edge 1408. Channel 1432 also extends along inside rail 1414 and outside rail 1420. Center rail 1445 further includes a channel 1447. Channels 1432 and 1447 help to funnel air towards the comb structures 1440. This further helps direct debris towards the comb structures 1440. FIG. 15 illustrates slider 1400 with a second row of raised protrusions in each of the comb structures 1440 to further collect debris.

Figure 16:
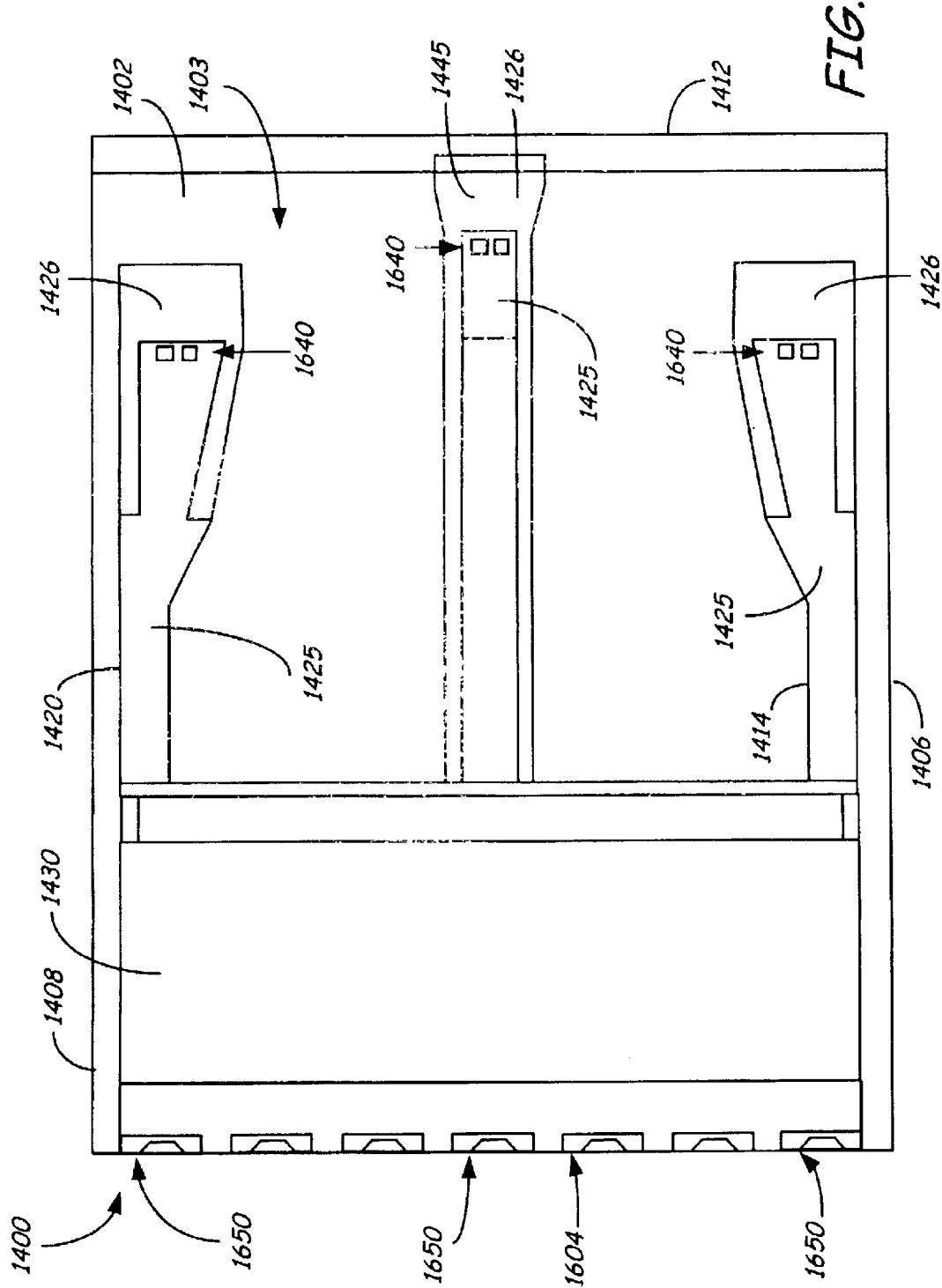
Figure 17:
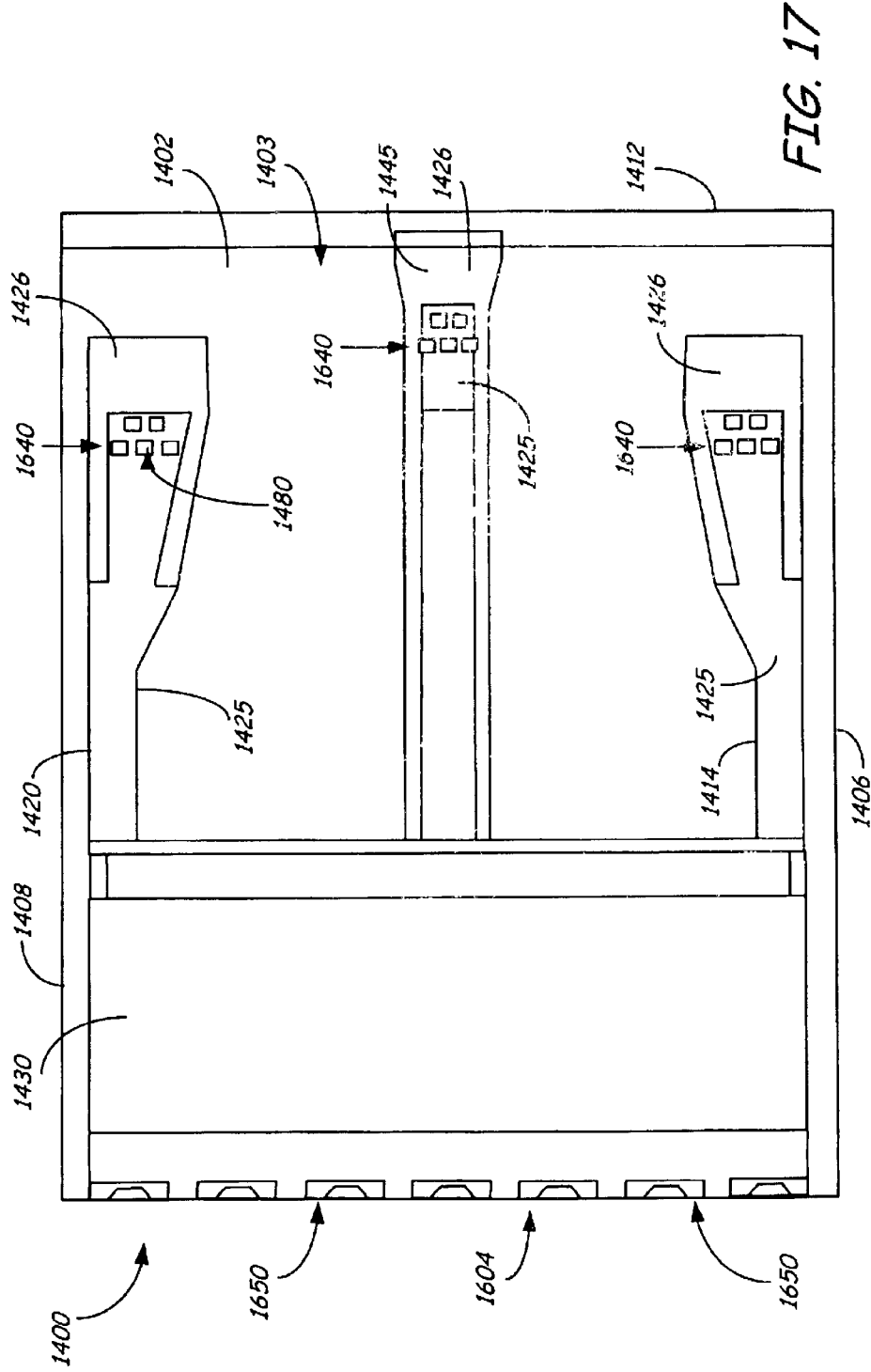
Figure 18:
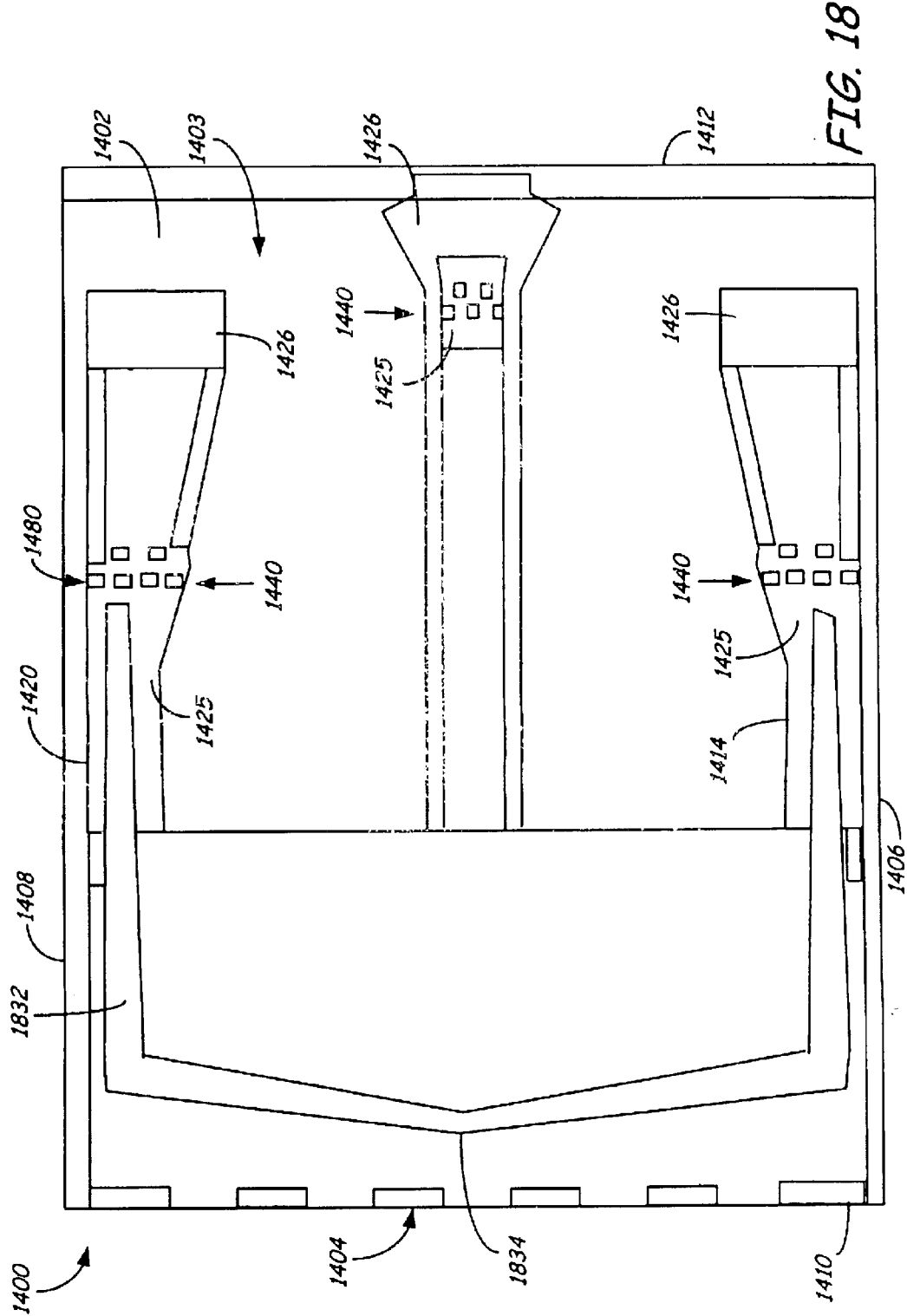

FIGS. 16–18 illustrate slider 1400 similar to those illustrated in FIGS. 14 and 15. In FIGS. 16 and 17, however, a plurality of cup shaped protrusions 1650 are placed at the leading slider edge. Also, the comb structures 1640 have been positioned closer to the trailing edge of the slider and enveloped in the U-shaped bearing surfaces 1648. FIG. 17 includes two rows of raised protrusions enveloped in bearing surfaces 1426. FIG. 18 illustrates slider 1400 having an alternative embodiment of a channel 1832. Channel 1832 extends from a point 1834 close to leading edge 1410 and towards inside edge 1406 and outside edge 1408. Channel 1832 further extends towards inside rail 1414 and outside rail 1420 towards comb structures 1440.

Figure 20:
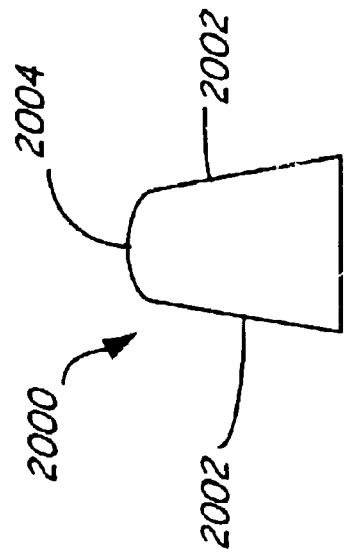
FIGS. 19–20 are schematic views of alternative protrusions.
Figure 19:
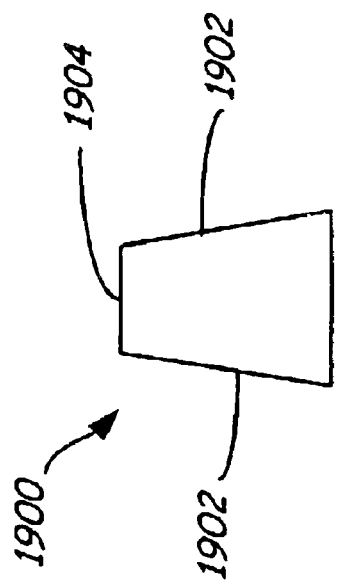

FIGS. 19–20 illustrate cross sections of protrusions for use in various comb structures. FIG. 19 illustrates protrusion 1900 including angled portions 1902 and flat top portion 1904. One of the angled portions 1902 may face a leading edge of a slider, if desired. Protrusion 2000 of FIG. 20 is similar to protrusion 1900 and includes angled portions 2002. In addition, a rounded top portion 2004 is provided to reduce stress when contacting a disc surface.

In summary, a head slider (110, 300, 400, 500, 600, 700, 800, 900, 1000, 1100, 1200, 1300, 1400) is provided that includes a slider body (402, 502, 702, 902, 1102, 1402) having leading and trailing slider edges (410, 412; 510, 512; 710, 712; 910, 912; 1110, 1112; 1410, 1412) and first and second side edges (406, 408; 506, 508; 706, 708; 906, 908; 1106, 1108; 1406, 1408). The body (402, 502, 702, 902, 1102, 1402) further includes a disc facing surface (403, 503, 703, 903, 1103, 1403) having an air bearing surface generally disposed within a bearing surface plane. A raised portion is positioned on the bearing surface plane and spaced apart from the leading edge (410, 510, 710, 910, 1110, 1410). Also, a comb structure (404, 504, 604, 704, 804, 904, 1004, 1104, 1404) is provided having a plurality of raised protrusions (450, 550, 650, 750, 850, 950, 1050, 1150, 1450) positioned proximate and substantially parallel to the leading edge of the slider, wherein the plurality of raised protrusions form gaps (452, 552, 652, 752, 852, 952, 1052, 1152, 1452) throughout the leading edge.

In another embodiment, a head slider (1400) includes a slider body (1402) with leading and trailing slider edges (1410, 1412) and first and second side edges (1406, 1408). The body (1402) has a disc facing surface (1403) including an air bearing surface generally disposed within a bearing surface plane. At least one rail (1414, 1420, 1445) extends toward the trailing edge and includes a recessed surface (1425) and a bearing surface (1426). In addition, a comb structure (1440, 1640) is positioned on the recessed surface closer to the leading edge than the bearing surface and including a plurality of raised protrusions (1480) substantially parallel to the leading edge (1410). The plurality of raised protrusions further form gaps (1482) throughout the recessed surface (1425).

It is to be understood that even though numerous characteristics and advantages of various embodiments of the invention have been set forth in the foregoing description, together with details of the structure and function of various embodiments of the invention, this disclosure is illustratively only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive system while maintaining substantially the same functionality without departing from the scope and spirit of the present invention. Also, the debris deflecting elements herein described may be used alone or in various combinations. In addition, although the preferred embodiment described herein is directed to a disc head slider having a specialized disc-facing surface configurations, it will be appreciated by those skilled in the art that the teaching of the present invention can be applied to other types of sliders, such as a positive pressure slider having no cavity dam and sliders having different numbers of rails and rail shapes without departing from the scope and spirit of the present invention. Also, the present invention can be used with any type of ramp load-unload or contact start-stop suspension, such as rotary and linear suspensions, and the transducing head can be of any type such as magnetic, magneto-resistive, optical or magneto-optical, for example.

What is claimed is:

1. A head slider comprising:

a slider body comprising leading and trailing slider edges and first and second side edges, the body having a disc facing surface including an air bearing surface generally disposed within a bearing surface plane; and a plurality of raised cup-shaped protrusions forming gaps throughout the leading edge and positioned proximate and substantially parallel to the leading edge of the slider, the plurality of raised cup-shaped protrusions having openings facing the leading edge.

2. The head slider of claim 1 and further comprising at least one rail positioned on the disc facing surface, the rail having a plurality of raised protrusions forming at least one gap.

3. The head slider of claim 2 wherein the plurality of raised protrusions on the rail are arranged in a first row and a second row disposed further away from the leading edge than the first row.

4. The head slider of claim 2 and further comprising a second rail positioned on the disc facing surface and having a plurality of raised protrusions forming at least one gap.

5. The head slider of claim 1 and further comprising a raised portion having a surface coplanar with the bearing surface plane and spaced apart from the leading edge.

6. The head slider of claim 5 wherein the raised portion includes a cavity dam.

7. The head slider of claim 6 wherein the raised portion further comprises a first side rail extending from the cavity dam toward the trailing edge and a second side rail extending from the cavity dam toward the trailing edge.

8. The head slider of claim 7 wherein the raised portion further includes a center rail extending from the cavity dam toward the trailing edge.

9. The head slider of claim 8 wherein each of the first side rail, the second side rail and the center rail include a plurality of raised protrusions forming at least one gap.

10. The head slider of claim 9 wherein the plurality of raised protrusions on the first side rail, the second side rail and the center rail are arranged in a first row and a second row, the second row arranged to block fluid flow from the first row.

11. The head slider of claim 1 and further comprising a raised portion having a surface below a surface of the plurality of raised protrusions and spaced apart from the leading edge.

12. The head slider of claim 1 and further comprising a raised portion having a surface coplanar with a surface of the plurality of raised protrusions and spaced apart from the leading edge.

13. A head slider comprising:

a slider body comprising leading and trailing slider edges and first and second side edges, the body having a disc facing surface including an air bearing surface generally disposed within a bearing surface plane; and at least six raised, cup-shaped protrusions having openings facing the leading edge and positioned proximate and substantially parallel to the leading edge of the slider, wherein the at least six raised protrusions form gaps throughout the leading edge and are spaced apart from the first side edge and the second side edge.

14. The head slider of claim 13 and further comprising a channel spaced apart from the at least six raised protrusions and disposed further away from the leading edge than the at least six raised protrusions.

15. The head slider of claim 13, wherein the at least six raised protrusions are arranged in a first row and a second row spaced apart from the first row, wherein the second row is disposed further away from the leading edge than the first row.

16. The head slider of claim 15, wherein the first row is open to fluid flow from the leading edge and wherein the second row blocks fluid flow from the first row.

17. The head slider of claim 13, wherein each of the at least six raised protrusions include an angled portion facing the leading edge.

18. The head slider of claim 13, wherein the at least six raised protrusions are isolated pads.

19. The head slider of claim 13, wherein the at least six raised protrusions are coplanar with the bearing surface plane.

20. The head slider of claim 13 and further comprising at least one rail having a bearing surface positioned on the disc facing surface and a comb structure positioned on the rail having a plurality of raised protrusions forming gaps therebetween.

21. The head slider of claim 20, wherein the comb structure includes a plurality of raised protrusions arranged in a first row and a second row.

22. The head slider of claim 20 wherein the bearing surface is U-shaped' and the comb structure is enveloped in the bearing surface.

23. A head slider comprising:

a slider body comprising leading and trailing slider edges and first and second side edges, the body having a disc facing surface including an air bearing surface generally disposed within a bearing surface plane; and a comb structure comprising a plurality of raised, cup-shaped protrusions having openings facing the leading edge and positioned proximate and substantially parallel to the leading edge of the slider, wherein the plurality of raised protrusions form gaps throughout the leading edge and are arranged in a first row and a second row spaced apart from the first row, wherein the second row is disposed further away from the leading edge than the first row and wherein the second row blocks fluid flow from the first row.

* * * * *

UNITED STATES PATENT AND TRADEMARK OFFICE
CERTIFICATE OF CORRECTION

| | | |
|---|---|---|
| PATENT NO. | : 6,920,015 B2 | Page 1 of 1 |
| APPLICATION NO. | : 10/114843 | |
| DATED | : July 19, 2005 | |
| INVENTOR(S) | : Mundt et al. | |

It is certified that error appears in the above-identified patent and that said Letters Patent is hereby corrected as shown below:

On the title page, item:

(75) Inventors: Change "Michael E. Mundt" to --Michael D. Mundt--

Col. 14, line 38: Change "U-shaped' " to --U-shaped--

Signed and Sealed this

Twenty-fifth Day of December, 2007

JON W. DUDAS
*Director of the United States Patent and Trademark Office*